United States Patent
Holcombe, Jr.

(10) Patent No.: US 9,434,824 B2
(45) Date of Patent: Sep. 6, 2016

(54) NONFLAMMABLE SOLVENT COMPOSITIONS FOR DISSOLVING POLYMERS AND RESULTING SOLVENT SYSTEMS

(71) Applicant: Cressie E. Holcombe, Jr., Knoxville, TN (US)

(72) Inventor: Cressie E. Holcombe, Jr., Knoxville, TN (US)

(73) Assignee: ZYP COATINGS, INC., Oak Ridge, TN (US)

( * ) Notice: Subject to any disclaimer, the term of this patent is extended or adjusted under 35 U.S.C. 154(b) by 152 days.

(21) Appl. No.: 14/230,791

(22) Filed: Mar. 31, 2014

(65) Prior Publication Data

US 2015/0274900 A1 Oct. 1, 2015

(51) Int. Cl.

| | | |
|---|---|---|
| C08K 5/05 | (2006.01) | |
| C08L 53/00 | (2006.01) | |
| C11D 7/50 | (2006.01) | |
| C08J 3/09 | (2006.01) | |
| C09D 7/00 | (2006.01) | |
| C09J 133/12 | (2006.01) | |
| C08L 53/02 | (2006.01) | |
| C09D 133/06 | (2006.01) | |
| C11D 7/26 | (2006.01) | |
| C11D 7/28 | (2006.01) | |
| C11D 7/30 | (2006.01) | |

(52) U.S. Cl.
CPC ............... *C08J 3/095* (2013.01); *C08J 3/093* (2013.01); *C08K 5/05* (2013.01); *C08L 53/00* (2013.01); *C08L 53/025* (2013.01); *C09D 7/001* (2013.01); *C09J 133/12* (2013.01); *C11D 7/5018* (2013.01); *C11D 7/5022* (2013.01); *C08J 2325/08* (2013.01); *C08J 2333/12* (2013.01); *C09D 133/06* (2013.01); *C11D 7/265* (2013.01); *C11D 7/28* (2013.01); *C11D 7/30* (2013.01)

(58) Field of Classification Search
CPC ............................. C11D 7/5022; C11D 7/5018
See application file for complete search history.

(56) References Cited

U.S. PATENT DOCUMENTS

| | | |
|---|---|---|
| 3,239,478 A | 3/1966 | Harlan |
| 4,536,454 A | 8/1985 | Haasl |
| 4,745,139 A | 5/1988 | Haasl |
| 5,112,516 A | 5/1992 | Koetzle |
| 5,196,137 A | 3/1993 | Merchant |
| 5,314,940 A | 5/1994 | Stone |
| 5,393,451 A | 2/1995 | Koetzle |
| 5,610,128 A | 3/1997 | Zyhowski |
| 5,756,002 A | 5/1998 | Chen |
| 5,814,595 A | 9/1998 | Flynn |
| 6,020,299 A | 2/2000 | Chen |
| 6,274,543 B1 | 8/2001 | Milbrath |
| 6,303,549 B1 | 10/2001 | Burdzy |
| 6,429,176 B1 | 8/2002 | Chen |
| 6,478,880 B1 | 11/2002 | Shank |
| 7,163,645 B2 | 1/2007 | Hanada |
| 7,163,646 B2 | 1/2007 | Hanada |
| 7,273,839 B2 | 9/2007 | Koetzle |
| 7,767,637 B2 | 8/2010 | Simandl |
| 7,833,959 B1 | 11/2010 | Koetzle |
| 7,858,685 B2 | 12/2010 | Barry |
| 8,092,715 B2 | 1/2012 | Howard |
| 8,354,042 B2 | 1/2013 | Howard |
| 2002/0026881 A1 | 3/2002 | Ludwig |
| 2003/0050356 A1 | 3/2003 | Bogdan |
| 2003/0228997 A1 | 12/2003 | Doyel |
| 2004/0224870 A1 | 11/2004 | Doyel |
| 2005/0119403 A1 | 6/2005 | St. Clair |
| 2005/0268946 A1 | 12/2005 | Miles |
| 2006/0068112 A1 | 3/2006 | Chapman |
| 2006/0281855 A1 | 12/2006 | Garfield |
| 2008/0153970 A1 | 6/2008 | Salazar |
| 2010/0240573 A1 | 9/2010 | Zysman |
| 2010/0298479 A1 | 11/2010 | Barry |
| 2011/0140047 A1 | 6/2011 | Howard |
| 2011/0309287 A1 | 12/2011 | Chen |
| 2012/0010116 A1 | 1/2012 | Minor |

OTHER PUBLICATIONS

Novee 3M Horizons Newsletter, Winter 2009.
How to Select a Vapor Degreasing Solvent, Dow Chemical, Jul. 2000.
Development of New Products for Cleaning, Dupont, Bartelt, Apr. 2011.
The Science of Precision & Electronics Cleming, 3M, 2003.
Halogenated Solvents, World Environment and Energy, 2011.
Thermally Conductive Insulators, JaBar, 2005.
Replacing HAP Solvents: Xylene and Toluene Nuts & Bolts, PCI, Apr. 2006.

*Primary Examiner* — Wenwen Cai
(74) *Attorney, Agent, or Firm* — Amy Allen Hinson; Nexsen Pruet, LLC

(57) ABSTRACT

A solvent composition and method for making same is disclosed having a composition between 26 to 90 weight percent propionate, butyrate, or combination thereof and between 10 to 74 weight percent fluorinated solvent blend, wherein the fluorinated solvent blend includes t-DCE. A polymer solvent system is also disclosed incorporating the solvent composition and dissolved polymers, such as SEBS polymers. The solvent composition and polymer solvent system is minimally combustible or preferably nonflammable.

52 Claims, 17 Drawing Sheets

NONFLAMMABLE SOLVENT COMPOSITIONS FOR DISSOLVING POLYMERS AND RESULTING SOLVENT SYSTEMS

BACKGROUND

The present invention relates generally to the field of solvents. More particularly, the present invention relates to solvent compositions that dissolve polymers such as Styrene-Ethylene/Butylene-Styrene (SEBS) and create a liquid polymer solvent system having various uses such as in coatings, sealants, and/or adhesives. Furthermore, the solvent compositions and systems of the present invention are preferably classed as nonflammable or combustible, having a range of evaporation/drying rates, and are preferably safe and relatively environmentally friendly.

The use of polymers such as SEBS polymers is extensive. For example, SEBS polymers are frequently used in adhesives, sealants, and coatings. SEBS polymers also have widespread industry usage through incorporation into various products such as road surface materials, roofing materials, shoes, and packaging materials.

Liquid formulations of SEBS polymers have been used that incorporate high solvency solvents, such as toluene, to dissolve the SEBS polymer to a liquid solvent system that incorporates both the solvent and the SEBS polymer. Known solvent compositions for dissolving SEBS, however, are highly flammable and have significant health and environmental concerns. Thus, the resulting liquid SEBS solvent system is also flammable and has significant health and environmental concerns. Combustible and nonflammable materials are preferred for reasons such as having less shipping/handling requirements compared with Flammable materials.

Thus, there is a need for a solvent composition that dissolves polymers, such as SEBS polymers, and is nonflammable or has low flammability while also maintaining non-hazardous health and environmental properties and creates a liquid polymer solvent system that is preferably suitable for use in cleaning agents, coatings, sealants, and/or adhesives.

SUMMARY

The present invention includes a solvent composition. In one embodiment of the invention, the solvent composition includes between 26 to 90 weight percent of a propionate, and between 10 to 74 weight percent of a fluorinated solvent blend, wherein the fluorinated solvent blend includes t-DCE. In another embodiment of the invention, the solvent composition includes between 26 to 90 weight percent of a butyrate, and between 10 to 74 weight percent of a fluorinated solvent blend, wherein the fluorinated solvent blend includes t-DCE.

The present invention also includes a styrene solvent system. In one embodiment of the invention, the styrene solvent system includes a solvent composition having between 26 to 90 weight percent of a propionate and between 10 to 74 weight percent of a fluorinated solvent blend, wherein the fluorinated solvent blend includes t-DCE. The styrene solvent system further includes a styrene block copolymer. In another embodiment of the invention, the styrene solvent system includes a solvent composition having between 26 to 90 weight percent of a butyrate and between 10 to 74 weight percent of a fluorinated solvent blend, wherein the fluorinated solvent blend includes t-DCE. The styrene solvent system also further includes a styrene block copolymer.

The present invention also includes a styrene solvent system including a fluorinated solvent comprising 90 weight percent t-DCE and 10 weight percent HFE 7100. The styrene solvent system also includes a styrene block copolymer.

DETAILED DESCRIPTION OF REPRESENTATIVE EMBODIMENTS

Figure 1:
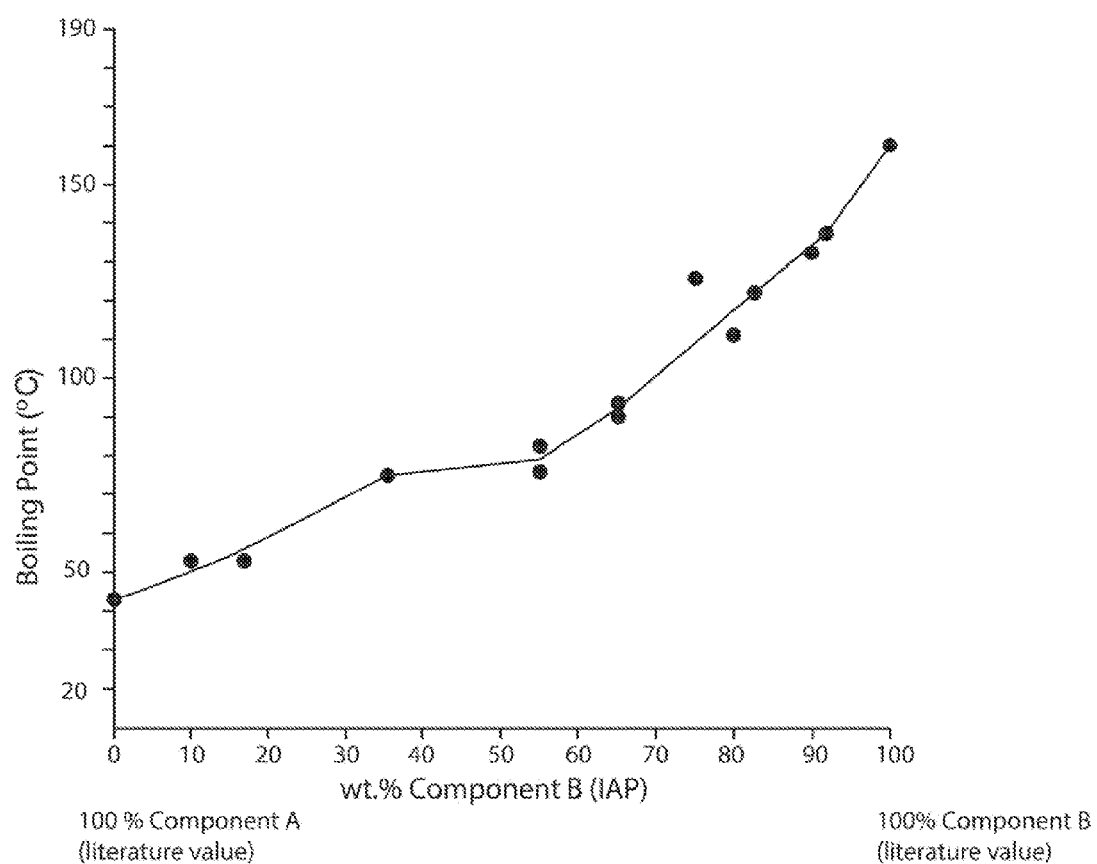
FIG. 1 is a schematic diagram of boiling point versus percent concentration of isoamyl propionate and Novec 72DE.

The present invention relates to a solvent composition that preferably dissolves polymers such as Styrene-Ethylene/Butylene-Styrene (SEBS) and creates a liquid solvent system incorporating the polymer. The resulting solvent system is preferably suitable for use as a solvent, protectant, coating, sealant, and/or adhesive. Furthermore, the solvent composition and resulting solvent system of the present invention is preferably classed as at least combustible or even more preferably classed as nonflammable and is further preferably relatively safe and environmentally friendly. The mixture of components of the solvent composition and system of the present invention may also be varied to yield a desired evaporation rate and drying time.

Although primarily described herein in terms of its suitability for dissolving polymers, the solvent composition of the present invention may have various additional uses. For example, the solvent composition may be used as a cleaning agent. Furthermore, it will be clear that the polymer solvent system of the present invention may have uses in addition to being used a solvent, protectant, coating, sealant, and/or adhesive. Further, the solvent composition and polymer solvent system of the present invention may also be combined with various other components such as suspenders, binders, additives, and/or fillers.

Unless otherwise stated, the following terms used in the specification and claims have the meanings given below.

As used herein unless otherwise stated, the term "flash point" refers to the lowest temperature at which a material can vaporize to form an ignitable mixture in air.

As used herein unless otherwise state, the term "cloud point" refers to the composition at which combined components are no longer miscible and the composition becomes cloudy. The cloud point as used herein is determined at ambient temperature.

While various classifications and regulations may vary and differ in assessment and description of flammability and combustibility, below are flammability and combustibility classifications as used herein.

As used herein unless otherwise stated, the term "flammable" refers to liquids with a flash point less than about 100 degree Fahrenheit (38 degrees Celsius) when an ignition source is used. The designation of "flammable" herein therefore includes current Environmental Protection Agency (EPA) flammability classifications for Class IA liquids (flash point below 73 degrees Fahrenheit (23 degrees Celsius) and boiling point below 100 degrees Fahrenheit (38 degrees Celsius)), Class IB liquids (flash point below 73 degrees Fahrenheit (23 degrees Celsius) and boiling point above 100 degrees Fahrenheit (38 degrees Celsius)), and Class IC liquids (flash point above 73 degrees Fahrenheit (23 degrees Celsius) and below 100 degrees Fahrenheit (38 degrees Celsius)).

As used herein unless otherwise stated, the term "combustible" refers to liquids with a flash point less than about 140 degrees Fahrenheit (60 degrees Celsius) but greater than about 100 degree Fahrenheit (38 degrees Celsius). The designation of "combustible" herein therefore includes current EPA flammability classifications for class II liquids (flash point about 100 degrees Fahrenheit (38 degrees Celsius) and below 140 degrees Fahrenheit (60 degrees Celsius)).

As used herein unless otherwise stated, the term "nonflammable" refers to liquids with a flash point greater than about 140 degree Fahrenheit (60 degrees Celsius). The designation of "nonflammable" herein therefore includes current EPA flammability classifications for class III liquids including both class IIIA liquids (flash point at or above 140 degrees Fahrenheit (60 degrees Celsius) and below 200 degrees Fahrenheit (93 degrees Celsius)) and class IIIB liquids (flash point at or above 200 degrees Fahrenheit (93 degrees Celsius)).

As discussed above, the present invention relates to solvent compositions that dissolve polymers such as Styrene-Ethylene/Butylene-Styrene (SEBS) as well as the resulting polymer solvent systems that incorporate both the polymer and the solvent composition. The solvent compositions of the present invention are preferably minimally combustible and most preferably nonflammable. Further, the solvent compositions are relatively safe to handle and environmentally friendly when compared to most currently known solvent compositions such as toluene that are capable of dissolving polymers including styrene polymers. Further, the solvent compositions of the present invention preferably allows for a range of desirable evaporation/drying rates including evaporation/drying to increase the usability over a wide array of products.

The solvent composition of the present invention is generally composed of at least two primary components: (1) a fluorinated solvent blend and (2) a propionate or a butyrate.

The fluorinated solvent blend includes 1,2-dichloroethylene and a fluorinated solvent. 1,2-dichloroethylene, also commonly known as 1,2-dichloroethene and 1,2-DCE, has a molecular formula $C_2H_2Cl_2$ or CClHCClH. Either geometric isomer of 1,2-DCE, including cis-1,2-DCE or trans-1,2-DCE (t-DCE), may be used. By itself, 1,2-DCE is very flammable with a flash point of approximately 55.4 degrees Fahrenheit (13 degrees Celsius). It has been determine, however, that 1,2-DCE combined with certain fluorinated solvents, such as discussed herein, results in a nonflammable or, minimally, a combustible composition. Further, it has been determined as discussed herein that t-DCE is very effective at dissolving styrene block polymers. 1,2-DCE, while not considered a carcinogen, is considered a VOC and therefore it is preferred to limit the quantities of 1,2-DCE used in the fluorinated solvent blend.

Various fluorinated solvents, such as hydrofluorocarbons (HFCs) and/or hydrofluoroethers (HFEs), may be used to compose the solvent composition of the present invention. For example, a mixture of HFEs, such as ethyl nonafluorobutyl ether ($C_6H_5F_9O$), ethyl nonafluoroisobutyl ether ($C_6H_5F_9O$), methyl nonafluorobutyl ether ($C_5H_3F_9O$), and methyl nonafluoroisobutyl ether ($C_5H_3F_9O$), may be used to compose the fluorinated solvent. Novec 72DE is a suitable blend of the above disclosed HFEs, which also includes t-DCE. Novec 72DE includes approximately 68 through 72 weight percent t-DCE, approximately 4 through 16 weight percent ethyl nonafluorobutyl ether, approximately 4 through 16 weight percent ethyl nonafluoroisobutyl ether, approximately 2 through 8 percent methyl nonafluorobutyl ether, and approximately 2 through 8 percent methyl nonafluoroisobutyl ether. Methoxy-nonafluorobutane, also known as HFE 7100, may also be used. HFE 7100 has a molecular formula of $C_4F_9OCH_3$ or $C_5F_9OH_3$. A suitable combination of HFE with t-DCE is sold under the name Novec 71 D90 and includes about 90 weight percent t-DCE and 10 weight percent HFE 7100. Another suitable fluorinated solvent is 1,1,1,2,2,3,4,5,5,5-decafluoropentane, which has a molecular formula of $C_5F_{10}H_2$. 1,1,1,2,2,3,4,5,5-decafluoropentane is sold by itself under the name Vertrel XF and is sold in combination with t-DCE under the name Vertrel MCA. The Vertrel MCA composition includes approximately 61 through 63 weight percent 1,1,1,2,2,3,4,5,5,5-ecafluoropentane and approximately 37 through 39 weight percent t-DCE. Additionally, 1,1,1,3,3 pentafluorobutane having a molecular formula of $C_4H_5F_5$ (CAS 406-58-6), 1,1,1,2,3,3,3-heptafluoropropane having a molecular formula of $C_3HF_7$ (CAS 431-89-0), and dichlorofluoroethane, also known as 1,1-dichloro-1-fluoroethane and having a molecular formula of $C_2H_3Cl_2F$ (CAS 1717-00-6), may be used including combinations thereof.

Additional fluorinated solvent compositions, including fluorinated solvent combinations and mixtures, may be used as will be understood by those of skill in the arts without departing from the scope of the present invention.

Various propionates and butyrates may be used in the solvent composition of the present invention. Example propionates include, but are not limited to, isoamyl propionate (CAS 105-68-0) and hexyl propionate (CAS 2445-76-3). Isoamyl propionate (IAP) has a chemical formula of $C_8H_{16}O_2$, a flash point of 118 degrees Fahrenheit (48 degrees Celsius), and a boiling point of 321 degrees Fahrenheit (160 degrees Celsius). Hexyl propionate (HP) has a chemical formula of $C_9H_{18}O_2$, a flash point of 149 degrees Fahrenheit (65 degrees Celsius), and a boiling point of 356 degrees Fahrenheit (180 degrees Celsius).

Example butyrates include, but are not limited to, isoamyl butyrate (CAS 106-27-4), amyl butyrate (CAS 540-18-1), n-butyl n-butyrate (CAS 109-21-7), isoamyl isobutyrate (CAS 2050-01-3), and amyl isobutyrate (CAS 2445-72-9). Isoamyl butyrate (IAB) has a chemical formula of $C_9H_{18}O_2$, a flash point of 138 degrees Fahrenheit (58 degrees Celsius), and a boiling point of 372 degrees Fahrenheit (189 degrees Celsius). Amyl butyrate (AB) has a chemical formula of $C_9H_{18}O_2$, a flash point of 133 degrees Fahrenheit (56 degrees Celsius), and a boiling point of 370 degrees Fahrenheit (188 degrees Celsius). N-butyl n-butyrate (nBnB) has a chemical formula of $C_8H_{16}O_2$, a flash point of 127 degrees Fahrenheit (53 degrees Celsius), and a boiling point of 327 degrees Fahrenheit (164 degrees Celsius). Isoamyl isobutyrate (IAIB) has a chemical formula of $C_{18}H_{36}O_4$, a flash point of 129 degrees Fahrenheit (54 degrees Celsius), and a boiling point of 340 degrees Fahrenheit (171 degrees Celsius). Amyl isobutyrate (AIB) has a chemical formula of $C_9H_{18}O_2$, a flash point of 133 degrees Fahrenheit (56 degrees Celsius), and a boiling point of 340 degrees Fahrenheit (171 degrees Celsius).

In one embodiment of the present invention that includes propionate, the solvent composition includes between 26 to 90 weight percent of a propionate and between 10 to 74 weight percent of a fluorinated solvent blend. In this embodiment, hexyl propionate may be used. Alternatively, isoamyl propionate may be used. Further, as discussed above, the fluorinated solvent blend preferably includes 1,2-DCE such as t-DCE. For example, the solvent composition may include about 68 to about 72 weight percent t-DCE and about 28 to about 32 weight percent mixture of hydrofluoroethers, such as ethyl nonafluorobutyl ether, ethyl nonafluoroisobutyl ether, methyl nonafluorobutyl ether, and methyl nonafluoroisobutyl ether. Alternatively, the solvent composition may include a blend of t-DCE and hydrofluorocarbons as the fluorinated solvent blend.

In another embodiment of the present invention that includes propionate, the solvent composition includes between 40 to 65 weight percent of a propionate and between 35 to 60 weight percent of a fluorinated solvent blend wherein the fluorinated solvent blend includes t-DCE. In yet a further embodiment of the present invention, the solvent composition includes between 60 to 80 weight percent of a propionate and between 20 to 40 weight percent of a fluorinated solvent blend wherein the fluorinated solvent blend includes t-DCE. The solvent composition is preferably combustible or more preferably nonflammable.

In one embodiment of the present invention that includes butyrate, the solvent composition includes between 26 to 90 weight percent of a butyrate and between 10 to 74 weight percent of a fluorinated solvent blend. In this embodiment n-butyl n-butyrate or amyl butyrate may be used. Alternatively, isoamyl butyrate, isoamyl isobutyrate, and/or amyl isobutyrate may be used. Further, as discussed above, the fluorinated solvent blend preferably includes 1,2-DCE such as t-DCE. For example, the solvent composition may include about 68 to about 72 weight percent t-DCE and about 28 to about 32 weight percent mixture of hydrofluoroethers, such as ethyl nonafluorobutyl ether, ethyl nonafluoroisobutyl ether, methyl nonafluorobutyl ether, and methyl nonafluoroisobutyl ether. Alternatively, the solvent composition may include a blend of t-DCE and hydrofluorocarbons as the fluorinated solvent blend.

In another embodiment of the present invention, the solvent composition includes between 40 to 65 weight percent of a butyrate and between 35 to 60 weight percent of a fluorinated solvent blend wherein the fluorinated solvent blend includes t-DCE. In yet a further embodiment of the present invention, the solvent composition includes between 60 to 80 weight percent of a butyrate and between 20 to 40 weight percent of a fluorinated solvent blend wherein the fluorinated solvent blend includes t-DCE. Like the propionate containing solvent composition, the butyrate solvent composition is also preferably combustible or more preferably nonflammable.

The solvent composition of the present invention may be used for many applications and determination of the particular components and ranges of components of the solvent composition typically depends on the particular use of the composition. For example, one composition may have properties better suited for use as a cleaning agent while a different composition may have properties better suited for mixing with concentrated paints or coatings to act as a carrier for such concentrated paints or coatings. Further, certain compositions may be used as a bonding agent while other compositions may be used as a debonder. Moreover, one composition may have properties better suited for dissolving a particular polymer, such as those discussed herein and including styrene polymers.

Further, selection of a particular propionate or butyrate as well as the amount of fluorinated solvent blend frequently depends on the desired evaporation/drying rate. For example, if faster drying time is desired, higher quantities of fluorinated solvent blend are typically incorporated into the composition and system. In contrast, if slower drying time is desired, lower quantities of fluorinated solvent blend are typically incorporated into the composition and system.

As discussed above, the solvent composition of the present invention may be combined with a polymer or a combination of polymers to create a polymer solvent system of the present invention. For example, the solvent composition of the present invention may be combined with a styrene polymer to create a styrene polymer solvent system of the present invention. A variety of styrene polymers may be used in the polymer styrene solvent system. For example, in one embodiment, a styrene block copolymer such as Styrene-Ethylene/Butylene-Styrene (SEBS) may be used. Several suitable styrene polymers are sold under the brand name Kraton™ such as Kraton G1652, Kraton G1643 (CAS 66070-58-4), and Kraton FG-1901. The styrene polymers are highly versatile and are typically in the form of synthetic rubber materials including resins, powders, and pellets. Styrene polymer may be combined with a solvent composition at approximately 1 through 50 weight percent of the solvent system. In another embodiment, the styrene polymer may be combined with a solvent composition at approximately 10 through 40 weight percent of the solvent system. In yet another embodiment, the styrene polymer may be combined with a solvent composition at approximately 20 through 30 weight percent of the solvent system. In a further embodiment, the styrene polymer may be combined with a solvent composition at approximately 5 through 25 weight percent of the solvent system.

Moreover, the solvent composition of the present invention may be combined with a methyl methacrylate copolymer to create the polymer solvent system of the present invention. Methyl methacrylate copolymer (CAS 9011-14-7) has a chemical formula of $C_5H_8O_2X_2$. Paraloid B48N, also known as Acryloid B48N, is an example of a methyl methacrylate copolymer that is suitable for use in the present invention. Paraloid B48N may be in the form of powder, pellets, or sheets and is typically hard and abrasion resistant. Methyl methacrylate copolymer may be combined with a solvent composition at approximately 1 through 50 weight percent of the solvent system. In another embodiment, the methyl methacrylate copolymer may be combined with a solvent composition at approximately 10 through 40 weight percent of the solvent system. In yet another embodiment, the methyl methacrylate copolymer may be combined with a solvent composition at approximately 20 through 30 weight percent of the solvent system. In a further embodiment, the methyl methacrylate copolymer may be combined with a solvent composition at approximately 5 through 25 weight percent of the solvent system.

Having generally described this instant disclosure, a further understanding can be obtained by reference to certain specific examples illustrated below which are provided for purposes of illustration only and are not intended to be all inclusive or limiting unless otherwise specified.

Testing & Examples

The preparation, identification, and testing of example compositions and systems of this disclosure are further described below. The particular materials and amounts thereof recited in these examples, as well as other conditions and details, should not be construed to unduly limit this invention. In these examples, all percentages, proportions and ratios are by weight unless otherwise indicated.

Several solvent compositions were tested to determine the solvent's ability to dissolve styrene polymers. Further, because a combustible or more preferably a nonflammable system was sought, the compositions and resulting styrene solvent systems were tested to determine the flash point of the compositions and resulting systems. Further, evaporation times and drying rates of the compositions and resulting systems are important for applicability of the compositions and systems. Thus, the boiling point, which is typically directly related to the evaporation/drying rate, was determined for the compositions and resulting systems.

Table I shown below discloses an example of a propionate and an example of a butyrate each having a flash point above 100 degrees Fahrenheit and each combined with a styrene polymer.

TABLE I

| Weight % | Component | Solvency |
|---|---|---|
| | Example 1 | |
| 75% | Isoamyl Propionate (IAP) | Dissolved |
| 25% | SEBS resin powder (CAS 66070-58-4) | |
| | Example 2 | |
| 75% | Isoamyl Butyrate (IAB) | Dissolved |
| 25% | SEBS resin powder (CAS 66070-58-4) | |

As disclosed above, both the IAP and the IAB dissolved the styrene polymer at the disclosed amount. The high boiling points of IAP and IAB however created a system with an evaporation/drying rate significantly higher than intended. For example, known flammable styrene polymer dissolvers, such as toluene and PlastiDip liquids, typically have boiling points around 176 to 248 degrees Fahrenheit (80 to 120 degrees Celsius).

To decrease the evaporation/drying rate caused by the high boiling points of the IAP and IAB, fluorinated solvent blends having lower boiling points were added to the composition. Tables II and III below disclose two examples of styrene solvent systems incorporating a fluorinated solvent blend.

TABLE II

| Weight % | Component | Solvency | Flash Point |
|---|---|---|---|
| | Example 3 | | |
| 41% | Isoamyl Propionate (IAP) | Dissolved | No Flash Observed |
| 33% | Novec 72DE 68-72 wt. % t-DCE 28-32 wt. % HFE blend (4-16 wt. % ethyl nonafluorobutyl ether, 4-16 wt. % ethyl nonafluoroisobutyl ether, 2-8 wt. % methyl nonafluorobutyl ether, and 2-8 wt. % methyl nonafluoroisobutyl ether) | | |
| 25% | SEBS resin powder (CAS 66070-58-4) | | |
| 1% | Colorant | | |
| | Liquid Mix of Example 3 | | |
| 55.4% | Isoamyl Propionate (IAP) | | |
| 44.6% | Novec 72DE 68-72 wt. % t-DCE 28-32 wt. % HFE blend (4-16 wt. % ethyl nonafluorobutyl ether, 4-16 wt. % ethyl nonafluoroisobutyl ether, 2-8 wt. % methyl nonafluorobutyl ether, and 2-8 wt. % methyl nonafluoroisobutyl ether) | | |

TABLE III

| Weight % | Component | Solvency | Flash Point |
|---|---|---|---|
| | Example 4 | | |
| 33% | Isoamyl Butyrate (IAB) | Dissolved | No Flash Observed |
| 41% | Novec 72DE 68-72 wt. % t-DCE 28-32 wt. % HFE blend (4-16 wt. % ethyl nonafluorobutyl ether, 4-16 wt. % ethyl nonafluoroisobutyl ether, 2-8 wt. % methyl nonafluorobutyl ether, and 2-8 wt. % methyl nonafluoroisobutyl ether) | | |
| 25% | SEBS resin powder (CAS 66070-58-4) | | |
| 1% | Colorant | | |
| | Liquid Mix of Example 4 | | |
| 44.6% | Isoamyl Butyrate (IAB) | | |
| 55.4% | Novec 72DE 68-72 wt. % t-DCE 28-32 wt. % HFE blend (4-16 wt. % ethyl nonafluorobutyl ether, 4-16 wt. % ethyl nonafluoroisobutyl ether, 2-8 wt. % methyl nonafluorobutyl ether, and 2-8 wt. % methyl nonafluoroisobutyl ether) | | |

As disclosed above, both the IAP/fluorinated solvent composition and the IAB/fluorinated solvent composition dissolved the styrene polymer at the disclosed amount. Further, the flash points of these styrene solvent systems were tested and no flash was observed. To further lower the evaporation/drying rate of the system, additional amounts of fluorinated solvent blend was added to determine the outer limits of solvency. It was determined that using the components set forth in Tables II and III, the outer limits of solvency were up to approximately 80-85 weight percent liquid mix of Novec 72DE and therefore down to approximately 15-20 weight percent liquid mix of IAB or IAP (the liquid mix being the mixture of fluorinated solvent blend and propionate or butyrate). Above this amount of Novec 72DE, the system reached its cloud point and the systems went from completely miscible to immiscible with two separate phase layers (the top layer being the propionate or butyrate with a specific gravity around 0.87 and the bottom layer being Novec 72DE with a specific gravity around 1.28). The boiling point of the system slightly below the upper limit of fluorinated solvent blend was around 60-65 degrees Celsius, which is a desirable boiling point for aerosol-can solvent systems.

Tests were also performed to determine if certain fluorinated solvents and fluorinated solvent blends without the use of propionates and butyrates would effectively dissolve styrene polymers. The t-DCE by itself was very effective at dissolving styrene polymers; however, pure t-DCE is highly flammable and has a flash point equal to 36 degrees Fahrenheit (2 degrees Celsius). Certain fluorinated solvent blends containing t-DCE, however, exhibit nonflammable or combustible properties, and it was determined that fluorinated solvents having higher amounts of t-DCE were highly effective at dissolving the styrene polymers. For example, a fluorinated solvent having about 90 weight percent t-DCE and 10 weight percent methoxy-nonafluorobutane, also known as HFE 7100, was very effective at dissolving styrene polymers without the addition of propionates or butyrates and is nonflammable. An acceptable fluorinated solvent having this composition is sold under the name Novec 71D90. Novec 71D90 has a boiling point of approximately 109 degrees Fahrenheit (43 degrees Celsius) and a high potential for evaporation of the HFE 7100 component. Thus, to keep the Novec 71 D90 from turning flammable, it must be stored in closed containers.

Incorporation of fluorinated solvents without some form of 1,2-DCE into a styrene solvent system, resulted in the fluorinated solvent salting out so that the system was not miscible. For example, the system using Novec 7100 and Vertrel-XF without the addition of 1,2-DCE did not create a miscible solvent system when combined with the SEBS resin. Further, fluorinated solvents with low levels of 1,2,-DCE, such as Vertrel MCA, which has approximately 38 weight percent t-DCE, were also not effective at completely dissolving the SEBS resin. On the other hand and as discussed above, fluorinated solvents having higher levels of 1,2-DCE, such as Novec 72DE and Novec 71 D90, which typically have greater than 65 weight percent t-DCE, resulted in better miscibility and particularly good miscibility when combined with the propionates/butyrates.

The SEBS resin used in Examples 3 and 4 above, was Kraton G1652 powder also identified as K084DDi09U. This SEBS resin powder includes a 30/70 styrene/rubber ratio. Kraton G1643, which is also identified as K460DDe09U, was substituted into the Examples 3 and 4 above in the place of Kraton G1652. Kraton G1643 includes a 20/80 styrene/rubber ratio and is less viscous than Kraton G1652 when incorporated into solvent systems; thus, a thinner liquid polymer styrene system resulted. A combination of Kraton G1652 and Kraton G1643 was also used, which yielded a desirable viscosity-blend.

Because solvency power is typically measured by the Kauri-Butanol Value (KB value) of a solvent, the KB value was determined for certain solvent compositions of the present invention. The KB value is a measure of solvency power whereby the higher the KB value, the higher the solvency power. KB values were measured using standard techniques such as shown in ASTM D 1133. The dissolving power of each solvent was tested by dissolving Kauri resin and then the dissolvability of the solvents were compared. A solvent having a KB value between 10-20 is typically considered a mild solvent while a solvent having a KB value above 75 is typically considered a strong solvent. Further, solvents having a KB value over 100 are typically considered powerful solvents. Known flammable compositions used to dissolve styrene polymer include toluene, which has a KB value of 105.

A solvent composition having 55 weight percent IAP and 45 weight percent Novec 72DE was tested and had a KB value of 78. Further, a solvent composition having 45 weight percent IAB and 55 weight percent Novec 72DE was tested and had a KB value of 66. The KB value of Novec 72DE was also determined and was 52. Because KB value of a mixture can sometimes be approximated by the weighted average of the KB value of the components in the mixture, it was calculated that the KB value of pure IAP is approximately 99 and the KB value of pure IAB is approximately 83.

Additional chemical solvents similar to IAP and IAB were tested to determine solvency power and ability to dissolve styrene polymer. Approximately 25 weight percent Kraton G-1652 SEBS polymer was combined with 75 weight percent of the individual chemical solvent. Shear was not used in combining the polymer and the solvent. Hexyl propionate (CAS 2445-76-3) was determined to have solvency similar to or better than IAP. Further, amyl butyrate (CAS 540-18-1), n-butyl n-butyrate (CAS 109-21-7), isoamyl isobutyrate (CAS 2050-01-3), and amyl isobutyrate (CAS 2445-72-9) were determined to have solvency similar to or better than IAB. Isobutyl isobutyrate (CAS 97-85-8) and n-pentyl propionate (CAS 624-54-4) also dissolved the SEBS polymer and had some flowability. Further, these chemical solvents may be combined with other chemical solvents to obtain a preferred evaporation/drying rate as more fully discussed below. For example, the above propionates and butyrates may be combined with allyl propionate (CAS 2408-20-0), butyl propionate (CAS 590-01-2), methyl amyl ketone (CAS 110-43-0), n-propyl propionate (CAS 106-36-5), isobutyl propionate (CAS 540-42-1), tert-butyl propionate (CAS 20487-40-5), ethyl propionate (CAS 105-37-3), methyl propionate (CAS 554-12-1), isopropyl propionate (CAS 637-78-5), ethyl 3-ethoxypropionate (CAS 763-69-9), ethyl 2-hydroxypropionate (CAS 97-64-3), ethyl 2-hydroxypropanoate (CAS 687-47-8), ethyl butyrate (CAS 105-54-4), methyl n-butyrate (CAS 623-42-7), and propyl butyrate (CAS 105-66-8).

Because selection of a particular propionate or butyrate as well as the amount of fluorinated solvent blend frequently depends on the desired evaporation/drying rate, the boiling points of compositions having various concentrations of a fluorinated solvent blend component and a propionate or butyrate component were determined. FIGS. 1 through 7 disclose schematic diagrams of boiling points of such solvent compositions of the present invention. A desirable boiling point for many applications of a solvent composition is typically in the range of 60 to 130 degrees Celsius or more preferably in the range of 80 to 120 degrees Celsius. Except as stated below, the boiling points were measured by Galbraith Labs using ASTMD110-11 standards and as set forth herein. The components of the solvent systems were combined at the designated weight percent concentration so that the compositions were miscible in all proportions. The compositions were distilled at ambient pressure (720 to 740 torr) in a concentric tube distillation column and then allowed to equilibrate at total reflux for at least 60 minutes. The boiling point of each distillate was measured using a thermocouple.

In FIGS. 1 through 7, Novec 72DE was the fluorinated solvent blend used and is denoted as Component A. As discussed above, Novec 72DE is a blend of hydrofluoroethers (HFEs) and t-DCE. More particularly, Novec 72DE is approximately 68 through 72 weight percent t-DCE, approximately 4 through 16 weight percent ethyl nonafluorobutyl ether, approximately 4 through 16 weight percent ethyl nonafluoroisobutyl ether, approximately 2 through 8 percent methyl nonafluorobutyl ether, and approximately 2 through 8 percent methyl nonafluoroisobutyl ether. Various propionates and butyrates are denoted as Component B. At zero percent on the diagram, the composition is entirely Component A, and the boiling point equals that of Novec 72DE, which has a listed boiling point of 43 degrees Celsius. At 100 percent on the diagram, the composition is entirely Component B and would therefore equal the boiling point of the particular propionate or butyrate. The boiling points of 100 percent of a component were not tested and instead were taken from readily available Material Safety Data Sheets (MSDS) and related literature on the particular components.

FIG. 1 is a schematic diagram of boiling point versus percent concentration of IsoAmyl Propionate (IAP) and Novec 72DE. All tested concentrations were miscible in all proportions. Table IV shows the exact compositions and measurements used to generate FIG. 1. As disclosed in FIG. 1 and Table IV, concentrations of Novec 72DE and IAP in a range of at least 17.5 to 64 weight percent Novec 72DE and 36 to 82.5 weight percent IAP have a boiling point range between 74.6 and 125.6 degrees Celsius, which, as discussed above, are desirable boiling points for many applications of a solvent composition. Further, no flash was observed in the solvent compositions below a concentration of 75 weight percent IAP. Thus, a nonflammable solvent composition was created over a wide range of IAP concentrations while maintaining desirable evaporation/drying rates.

TABLE IV

| % Component A (Novec 72DE) | % Component B (IAP) | Boiling Point ° C. | Flash Point ° F./° C. |
|---|---|---|---|
| 100% | 0% | 43 | No Flash |
| 90% | 10% | 50.6 | No Flash |
| 83% | 17% | 51.6 | No Flash |
| 64% | 36% | 74.6 | No Flash |
| 44.6% | 55.4% | 76.3 | No Flash |
| 45% | 55% | 81.6 | No Flash |
| 35% | 65% | 88.9 | No Flash |
| 35% | 65% | 91.6 | No Flash |
| 25% | 75% | 125.6 | No Flash |
| 20% | 80% | 110.6 | 64/18 |
| 17.5% | 82.5% | 120.6 | 82/28 |
| 10% | 90% | 131.6 | 86/30 |
| 8% | 92% | 136.6 | 93/34 |
| 0% | 100% | 160 | 103/39.4 |

Figure 2:
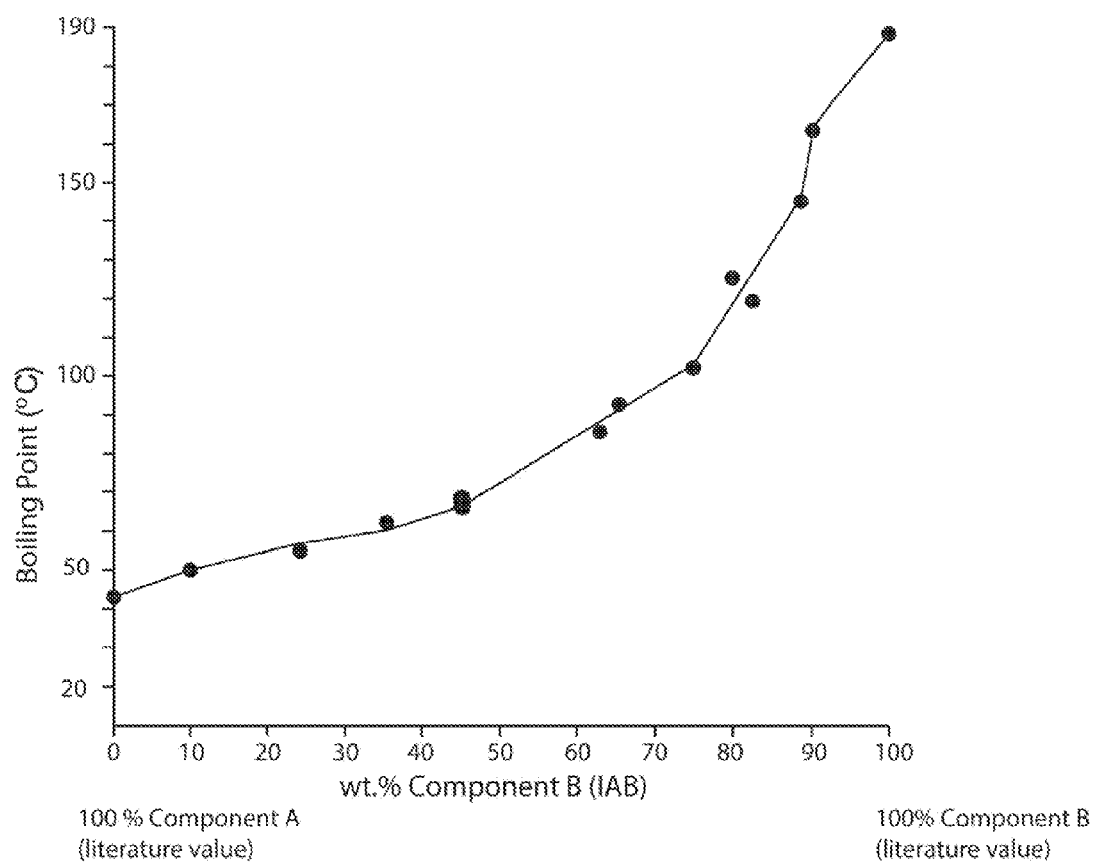
FIG. 2 is a schematic diagram of boiling point versus percent concentration of isoamyl butyrate and Novec 72DE.

FIG. 2 is a schematic diagram of boiling point versus percent concentration of IsoAmyl Butyrate (IAB) and Novec 72DE. All tested concentrations were miscible in all proportions. Table V shows the exact compositions and measurements used to generate FIG. 2. As disclosed in FIG. 2 and Table V, concentrations of Novec 72DE and IAB in a range of at least 17.5 to 65 weight percent Novec 72DE and 35 to 82.5 weight percent IAB have a boiling point range between 62.3 and 124.6 degrees Celsius, which, as discussed above, are desirable boiling points for many applications of a solvent composition. Further, no flash was observed in the solvent compositions below a concentration of 82.5 weight percent IAB. Thus, a nonflammable solvent composition was created over a wide range of IAB concentrations while maintaining desirable evaporation/drying rates.

TABLE V

| % Component A (Novec 72DE) | % Component B (IAB) | Boiling Point ° C. | Flash Point ° F./° C. |
|---|---|---|---|
| 100% | 0% | 43 | No Flash |
| 90% | 10% | 49.9 | No Flash |
| 75% | 25% | 54.9 | No Flash |
| 65% | 35% | 62.3 | No Flash |
| 55.4% | 44.6% | 66.3 | No Flash |
| 55% | 45% | 66.6 | No Flash |
| 37.5% | 62.5% | 84.6 | No Flash |
| 35% | 65% | 92.6 | No Flash |
| 25% | 75% | 101.6 | No Flash |
| 20% | 80% | 124.6 | No Flash |
| 17.5% | 82.5% | 118.6 | No Flash |
| 12% | 88% | 144.6 | 86/30 |
| 10% | 90% | 162.6 | 90/32 |
| 0% | 100% | 189 | 135/57.2 |

Figure 3:
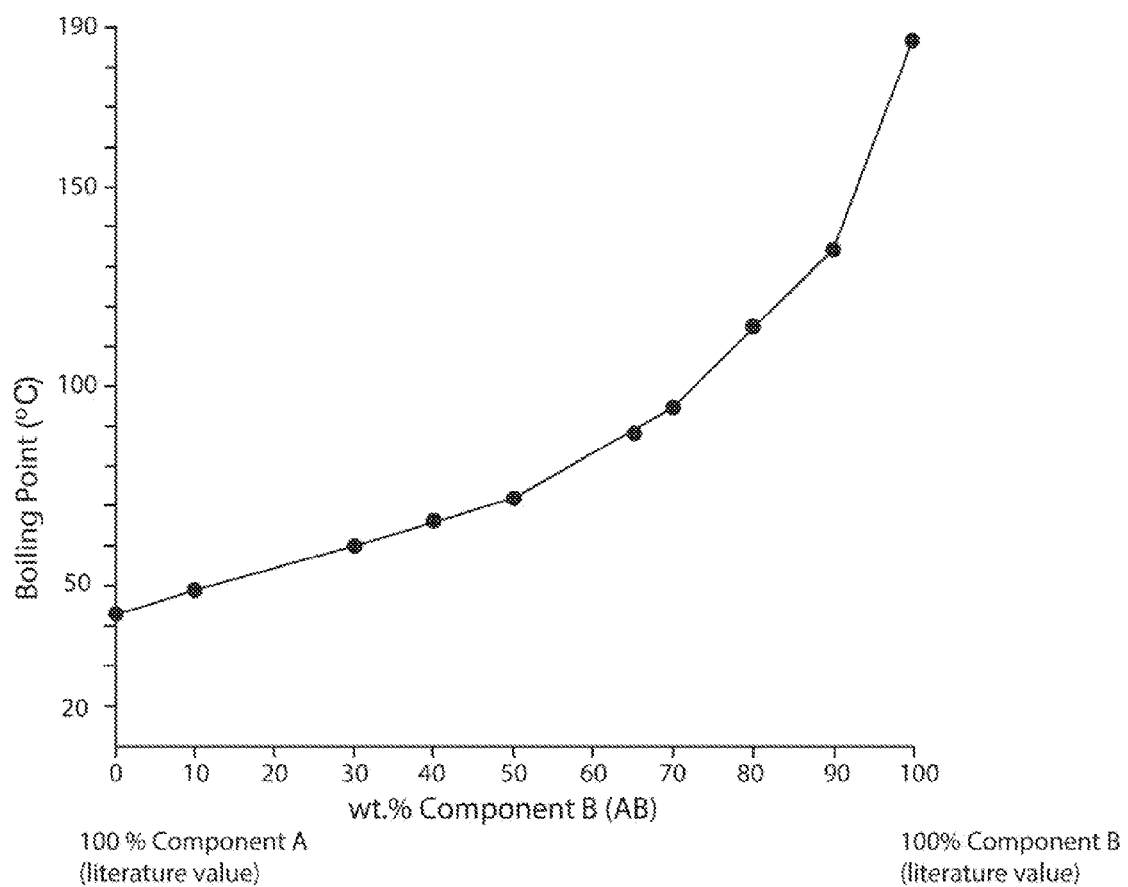
FIG. 3 is a schematic diagram of boiling point versus percent concentration of amyl butyrate and Novec 72DE.

FIG. 3 is a schematic diagram of boiling point versus percent concentration of Amyl Butyrate (AB) and Novec 72DE. All tested concentrations were miscible in all proportions. Table VI shows the exact compositions and measurements used to generate FIG. 3. As disclosed in FIG. 3 and Table VI, concentrations of Novec 72DE and AB in a range of at least 20 to 60 weight percent Novec 72DE and 40 to 80 weight percent AB have a boiling point range between 65.9 and 113.6 degrees Celsius, which, as discussed above, are desirable boiling points for many applications of a solvent composition. Further, no flash was observed in the solvent compositions below a concentration of 90 weight percent AB. Thus, a nonflammable solvent composition was created over a wide range of AB concentrations while maintaining desirable evaporation/drying rates. Further, because AB was particularly good at dissolving SEBS polymer, the KB value of certain of the below concentrations was also determined.

TABLE VI

| % Component A (Novec 72DE) | % Component B (AB) | KB Value | Boiling Point ° C. | Flash Point ° F./° C. |
|---|---|---|---|---|
| 100% | 0% | 52 | 43 | No Flash |
| 90% | 10% | Not Tested | 48.6 | No Flash |
| 70% | 30% | Not Tested | 57.6 | No Flash |
| 60% | 40% | 69.49 | 65.9 | No Flash |
| 50% | 50% | Not Tested | 71.9 | No Flash |
| 35% | 65% | 86.85 | 86.6 | No Flash |
| 30% | 70% | Not Tested | 93.6 | No Flash |
| 20% | 80% | 105.67 | 113.6 | No Flash |
| 10% | 90% | 114.98 | 133.6 | 102/39 |
| 0% | 100% | 134.19 | 188 | 133/56.1 |

Further, xylene, toluene, and plastidip solvents are flammable chemical compositions that may be used in connection with SEBS polymers. Xylene has a boiling point of approximately 139 degrees Celsius, toluene has a boiling point of approximately 111 degrees Celsius, and PlastiDip mixed solvent (combination of CAS 64742-48-9, CAS 110-54-3, CAS 108-88-3, and CAS 78-93-3) has a boiling point of approximately 88 degrees Celsius. As shown in Table VI above, the solvent composition at 90 weight percent AB and 10 weight percent Novec 72DE has a boiling point similar to Xylene, at 80 weight percent AB and 20 weight percent Novec 72DE has a boiling point similar to toluene, and at 65 weight percent AB and 35 weight percent Novec 72DE has a boiling point similar to PlastiDip. Furthermore, standard vapor cleaners used as aerosol-can carriers/vehicles typically have boiling points of approximately 60-65 degrees Celsius. As shown in Table VI above, the solvent composition at 40 weight percent AB and 60 weight percent Novec 72DE has a boiling point similar to such vapor cleaners.

Figure 4:
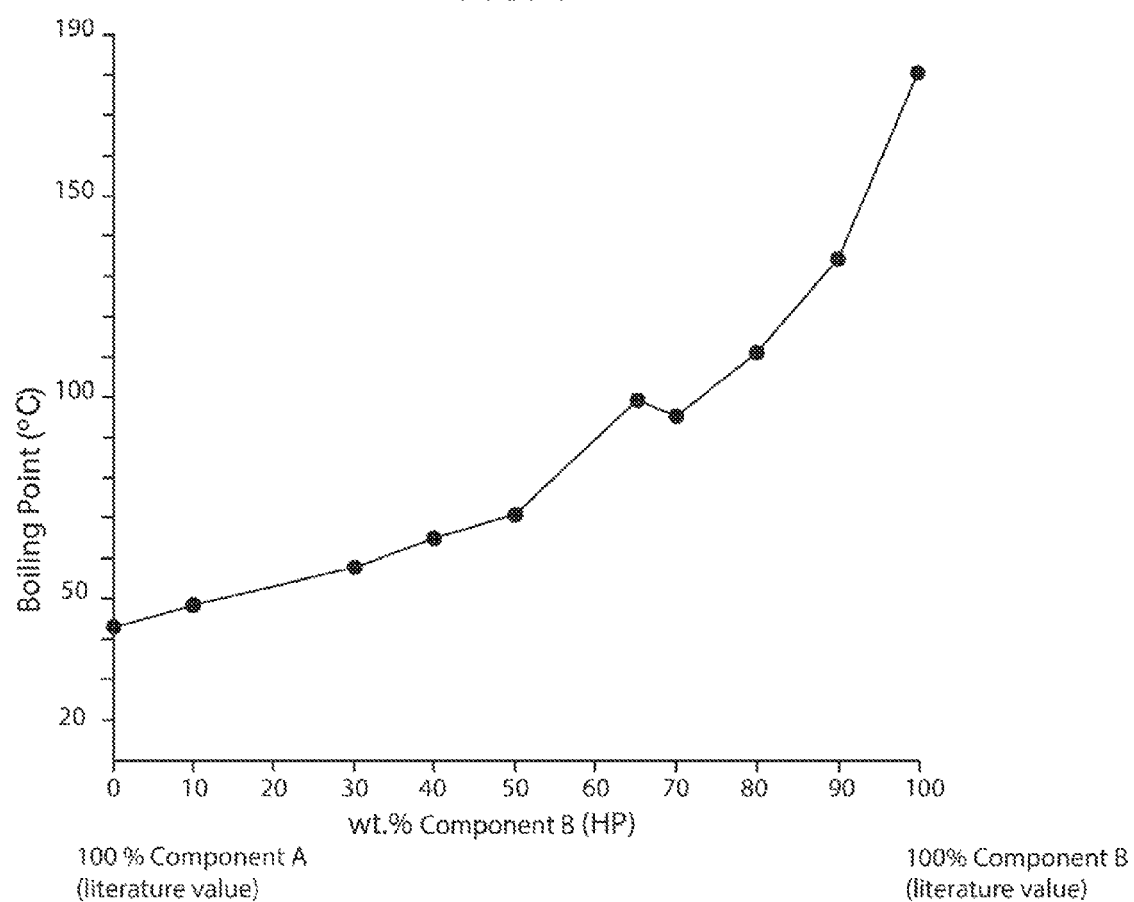
FIG. 4 is a schematic diagram of boiling point versus percent concentration of hexyl propionate and Novec 72DE.

FIG. 4 is a schematic diagram of boiling point versus percent concentration of Hexyl Propionate (HP) and Novec 72DE. All tested concentrations were miscible in all proportions. Table VII shows the exact compositions and measurements used to generate FIG. 4. As disclosed in FIG. 4 and Table VII, concentrations of Novec 72DE and HP in a range of at least 20 to 60 weight percent Novec 72DE and 40 to 80 weight percent HP have a boiling point range between 64.6 and 110.6 degrees Celsius, which, as discussed above, are desirable boiling points for many applications of a solvent composition. Further, no flash was observed in the solvent compositions below a concentration of 90 weight percent HP. Thus, a nonflammable solvent composition was created over a wide range of HP concentrations while maintaining desirable evaporation/drying rates. Further, because HP was also particularly good at dissolving SEBS polymer, the KB value of certain of the below concentrations was also determined.

TABLE VII

| % Component A (Novec 72DE) | % Component B (HP) | KB Value | Boiling Point ° C. | Flash Point ° F./° C. |
|---|---|---|---|---|
| 100% | 0% | 52 | 43 | No Flash |
| 90% | 10% | Not Tested | 47.9 | No Flash |
| 70% | 30% | Not Tested | 54.6 | No Flash |
| 60% | 40% | 68.23 | 64.6 | No Flash |
| 50% | 50% | Not Tested | 69.6 | No Flash |
| 35% | 65% | 91.51 | 98.6 | No Flash |
| 30% | 70% | Not Tested | 93.9 | No Flash |
| 20% | 80% | 84.52 | 110.6 | No Flash |
| 10% | 90% | 115.92 | 135.6 | 106/41 |
| 0% | 100% | 127.11 | 180 | 149/65 |

As shown in Table VII above, the solvent composition at 90 weight percent HP and 10 weight percent Novec 72DE has a boiling point similar to Xylene, at 80 weight percent HP and 20 weight percent Novec 72DE has a boiling point similar to toluene, and at 65 weight percent HP and 35 weight percent Novec 72DE has a boiling point similar to PlastiDip. Furthermore, the solvent composition at 40 weight percent HP and 60 weight percent Novec 72DE has a boiling point similar to standard vapor cleaners used as aerosol-can carriers/vehicles discussed above.

Figure 5:
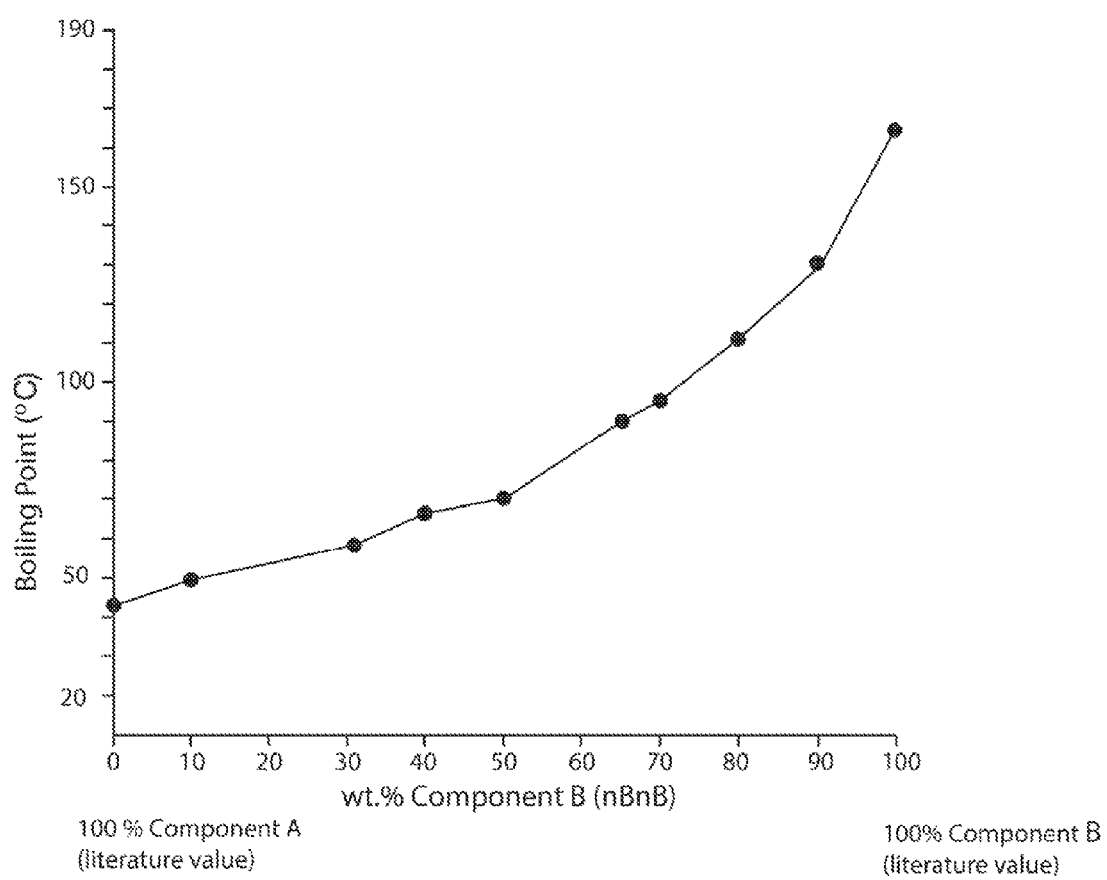
FIG. 5 is a schematic diagram of boiling point versus percent concentration of n-butyl n-butyrate and Novec 72DE.

FIG. 5 is a schematic diagram of boiling point versus percent concentration of n-Butyl n-Butyrate (nBnB) and Novec 72DE. All tested concentrations were miscible in all proportions. Table VIII shows the exact compositions and measurements used to generate FIG. 5. As disclosed in FIG. 5 and Table VIII, concentrations of Novec 72DE and nBnB in a range of at least 20 to 60 weight percent Novec 72DE and 40 to 80 weight percent nBnB have a boiling point range between 65.9 and 111.3 degrees Celsius, which, as discussed above, are desirable boiling points for many applications of a solvent composition. Further, no flash was observed in the solvent compositions below a concentration of 90 weight percent nBnB. Thus, a nonflammable solvent composition was created over a wide range of nBnB concentrations while maintaining desirable evaporation/drying rates. Further, because nBnB was particularly good at dissolving SEBS polymer, the KB value of certain of the below concentrations was also determined.

TABLE VIII

| % Component A (Novec 72DE) | % Component B (nBnB) | KB Value | Boiling Point ° C. | Flash Point ° F./° C. |
|---|---|---|---|---|
| 100% | 0% | 52 | 43 | No Flash |
| 90% | 10% | Not Tested | 48.9 | No Flash |
| 70% | 30% | Not Tested | 57.3 | No Flash |
| 60% | 40% | 82.95 | 65.9 | No Flash |
| 50% | 50% | Not Tested | 69.3 | No Flash |
| 35% | 65% | 112.54 | 89.6 | No Flash |
| 30% | 70% | Not Tested | 94.6 | No Flash |
| 20% | 80% | 116.90 | 111.3 | No Flash |
| 10% | 90% | 147.56 | 130.6 | 98/36.5 |
| 0% | 100% | 163.04 | 164 | 127/52.8 |

As shown in Table VIII above, the solvent composition at 90 weight percent nBnB and 10 weight percent Novec 72DE has a boiling point similar to Xylene, at 80 weight percent nBnB and 20 weight percent Novec 72DE has a boiling point similar to toluene, and at 65 weight percent nBnB and 35 weight percent Novec 72DE has a boiling point similar to PlastiDip. Furthermore, the solvent composition at 40 weight percent nBnB and 60 weight percent Novec 72DE has a boiling point similar to standard vapor cleaners used as aerosol-can carriers/vehicles discussed above.

Figure 6:
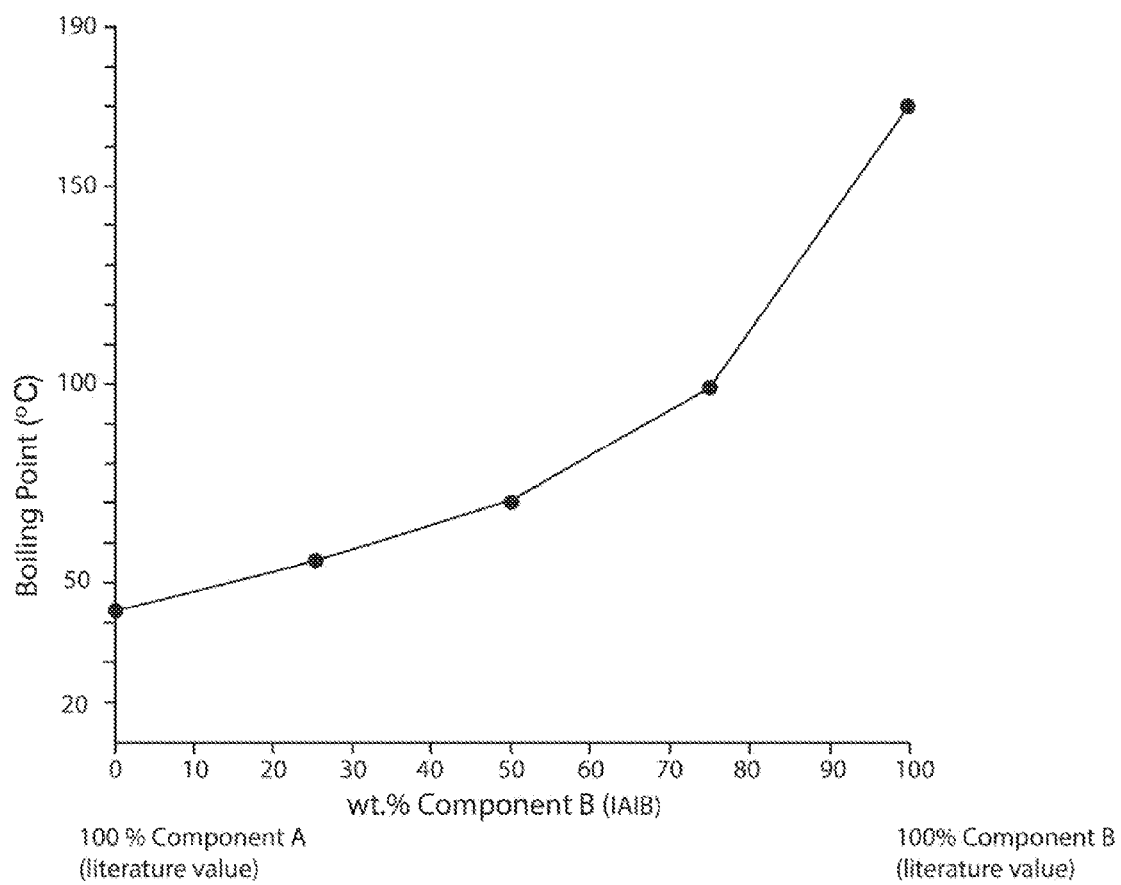
FIG. 6 is a schematic diagram of boiling point versus percent concentration of isoamyl isobutyrate and Novec 72DE.

FIG. 6 is a schematic diagram of boiling point versus percent concentration of IsoAmyl IsoButyrate (IAIB) and Novec 72DE. All tested concentrations were miscible in all proportions. Table IX shows the exact compositions and measurements used to generate FIG. 6. As disclosed in FIG. 6 and Table IX, concentrations of Novec 72DE and IAIB in a range of at least 25 to 50 weight percent Novec 72DE and 50 to 75 weight percent IAIB have a boiling point range between 69.9 and 99.3 degrees Celsius, which, as discussed above, are desirable boiling points for many applications of a solvent composition. Further, no flash was observed in the solvent compositions having both IAIB and Novec 72DE. Thus, a nonflammable solvent composition was created over a wide range of IAIB concentrations while maintaining desirable evaporation/drying rates.

TABLE IX

| % Component A (Novec 72DE) | % Component B (IAIB) | Boiling Point ° C. | Flash Point ° F./° C. |
|---|---|---|---|
| 100% | 0% | 43 | No Flash |
| 75% | 25% | 54.9 | No Flash |
| 50% | 50% | 69.9 | No Flash |
| 25% | 75% | 99.3 | No Flash |
| 0% | 100% | 171 | 129/53.9 |

Figure 7:
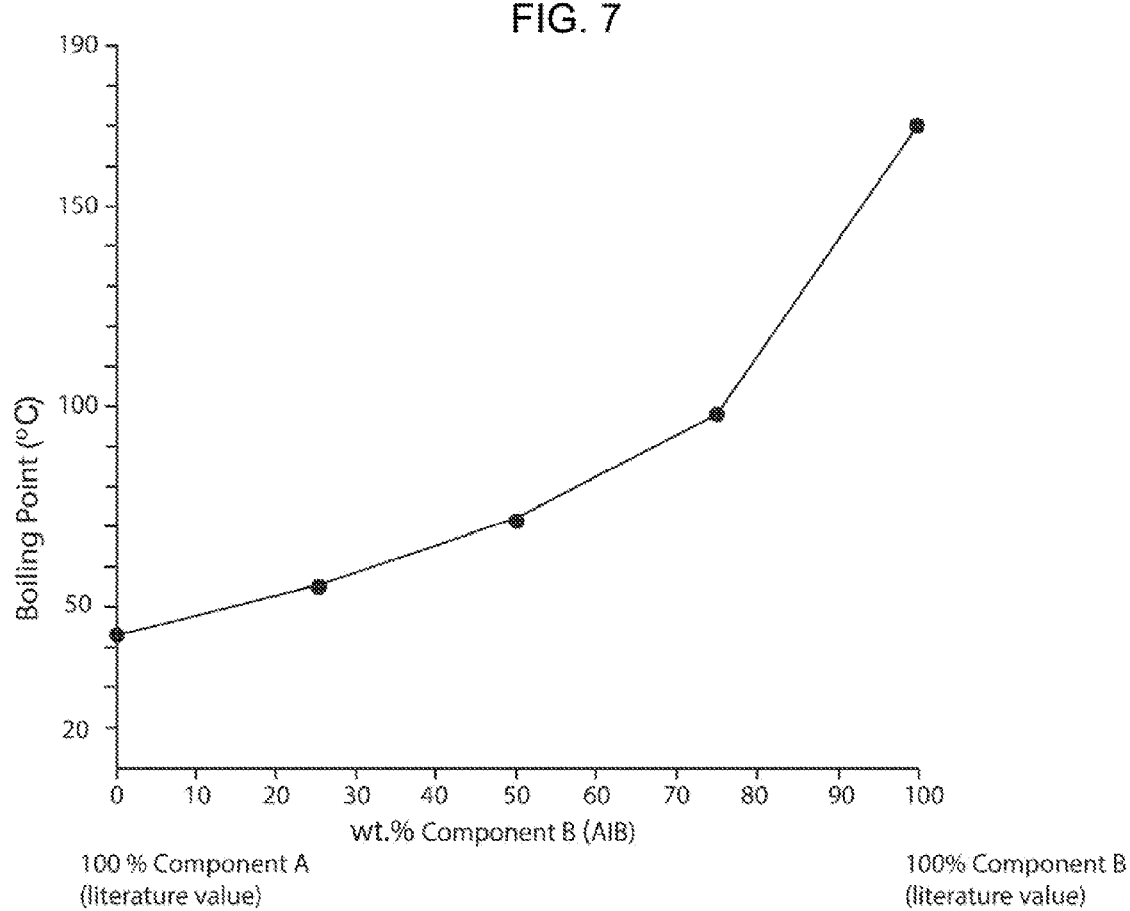
FIG. 7 is a schematic diagram of boiling point versus percent concentration of amyl isobutyrate and Novec 72DE.

FIG. 7 is a schematic diagram of boiling point versus percent concentration of Amyl IsoButyrate (AIB) and Novec 72DE. All tested concentrations were miscible in all proportions. Table X shows the exact compositions and measurements used to generate FIG. 7. As disclosed in FIG. 7 and Table X, concentrations of Novec 72DE and AIB in a range of at least 25 to 50 weight percent Novec 72DE and 50 to 75 weight percent AIB have a boiling point range between 71.9 and 96.9 degrees Celsius, which, as discussed above, are desirable boiling points for many applications of a solvent composition. Further, no flash was observed in the solvent compositions having both AIB and Novec 72DE. Thus, a nonflammable solvent composition was created over a wide range of AIB concentrations while maintaining desirable evaporation/drying rates.

TABLE X

| % Component A (Novec 72DE) | % Component B (AIB) | Boiling Point ° C. | Flash Point ° F./° C. |
|---|---|---|---|
| 100% | 0% | 43 | No Flash |
| 75% | 25% | 54.3 | No Flash |
| 50% | 50% | 71.9 | No Flash |
| 25% | 75% | 96.9 | No Flash |
| 0% | 100% | 171 | 133/56.1 |

While the pure butyrates and propionates disclosed above have high boiling points, which therefore leads to very high evaporation and drying rates for the solvents, mixing with a fluorinated solvent such as Novec 72DE significantly lowers the boiling points and therefore allows for tailoring of a particular desirable evaporation/drying rate as well as a particular desirable solvency power. Further, a broad range of nonflammable or combustible compositions are achievable by varying the amount of fluorinated solvent as well as with the particular selection of propionates and butyrates, including combinations thereof.

Moreover, because the drying/evaporation rate and actual vaporization rate will also vary depending on the heat of vaporization and cohesive energy density, a blend of the above solvents may achieve highly desirable drying characteristics. For example, a triple-blend of three of the above solvents, such as a 50/50 weight percent blend of ethyl propionate and Novec 72DE combined with a 50/50 blend of Novec 72DE and AB, HP, and/or nBnB, may result in practically any polymer-content dissolution and drying rate that is needed for a particular application.

Figure 8:
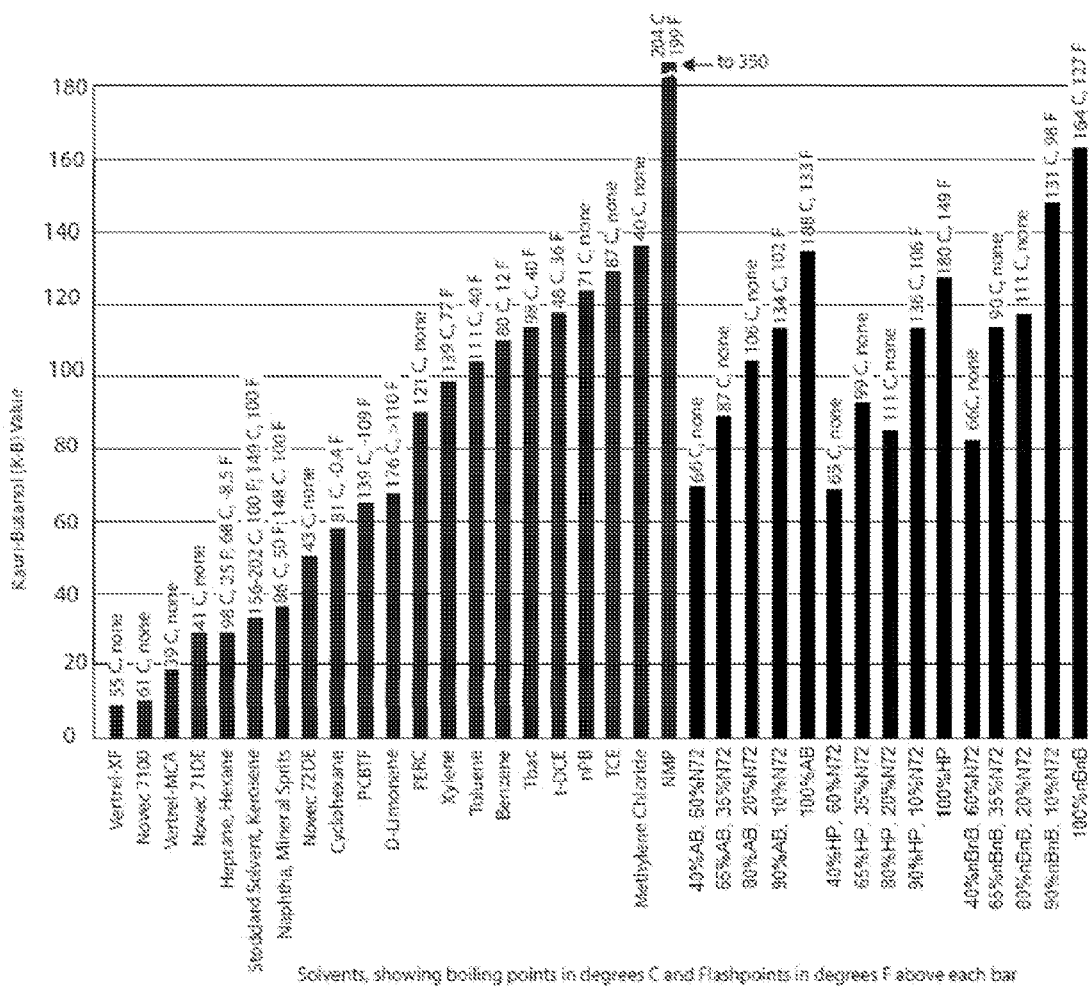
FIG. 8 is a comparative chart of KB values of standard solvents and solvent compositions of the present invention.
Figure 9:
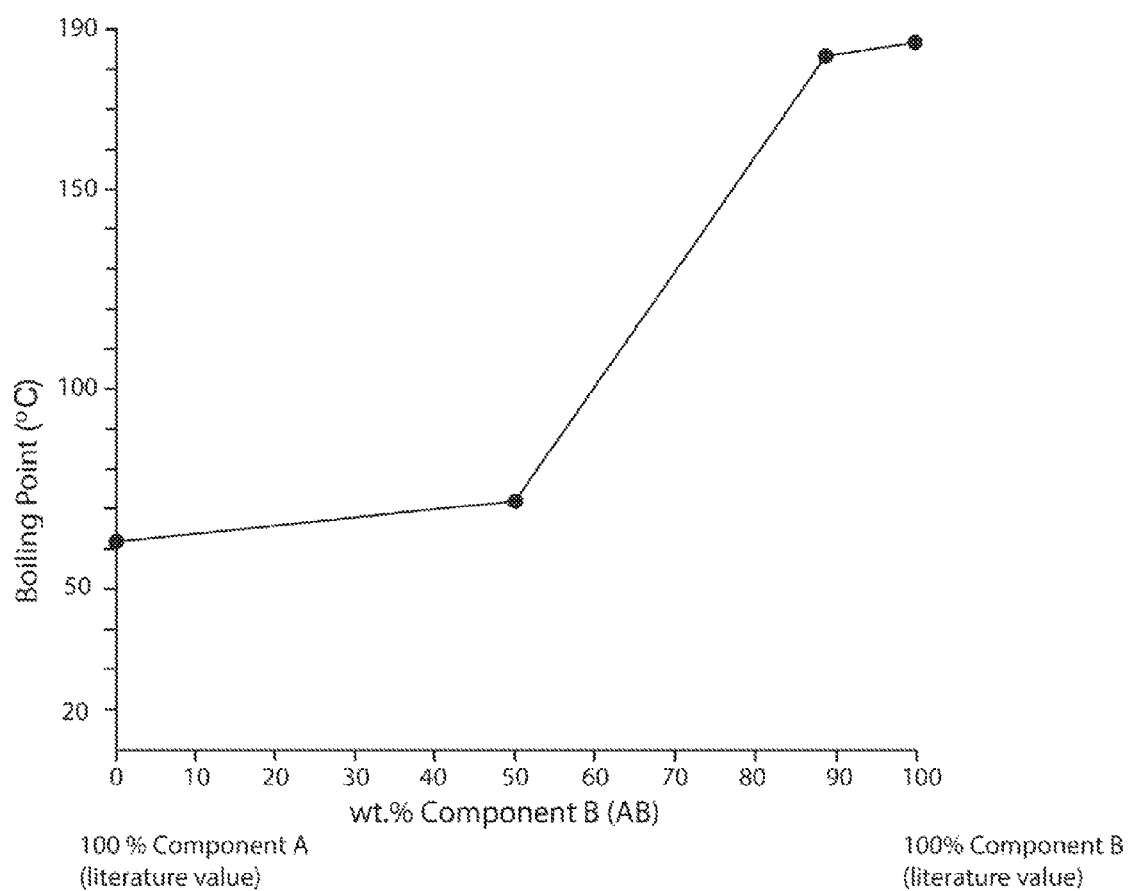
FIG. 9 is a schematic diagram of boiling point versus percent concentration of amyl butyrate and HFE 7100.
Figure 10:
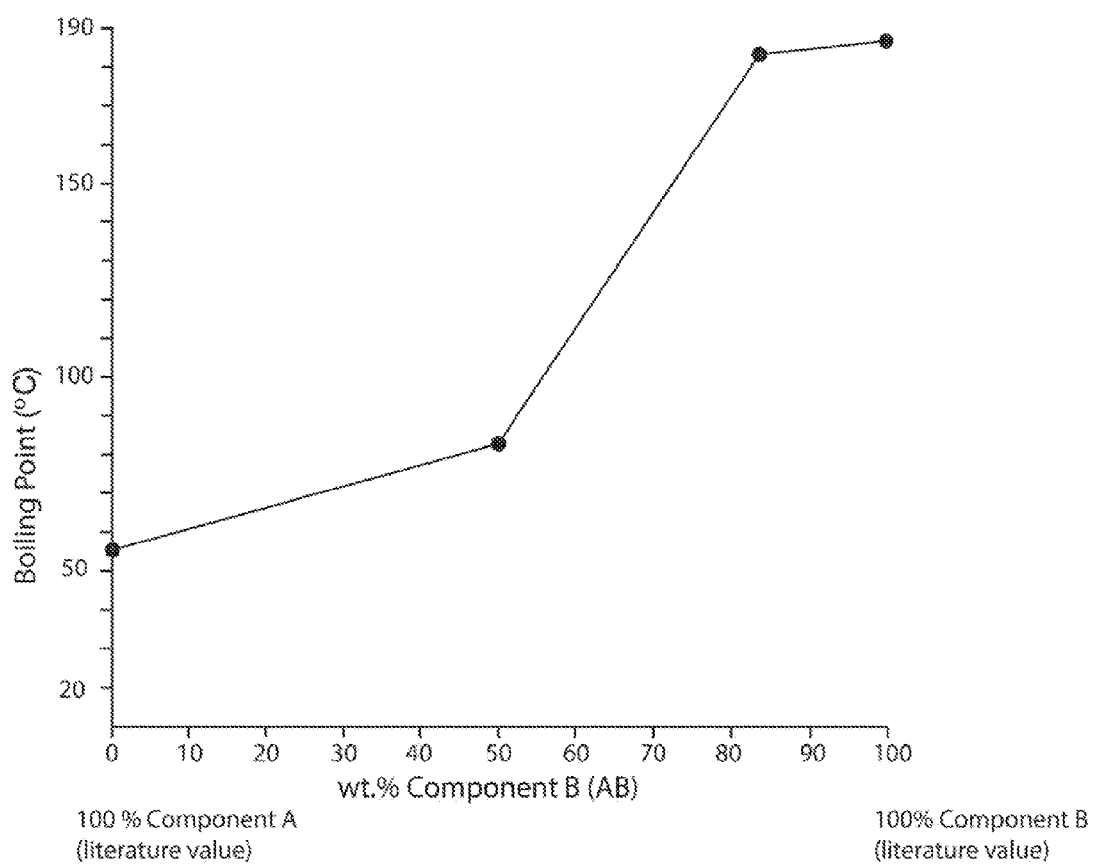
FIG. 10 is a schematic diagram of boiling point versus percent concentration of amyl butyrate and Vertrel-XF.
Figure 11:
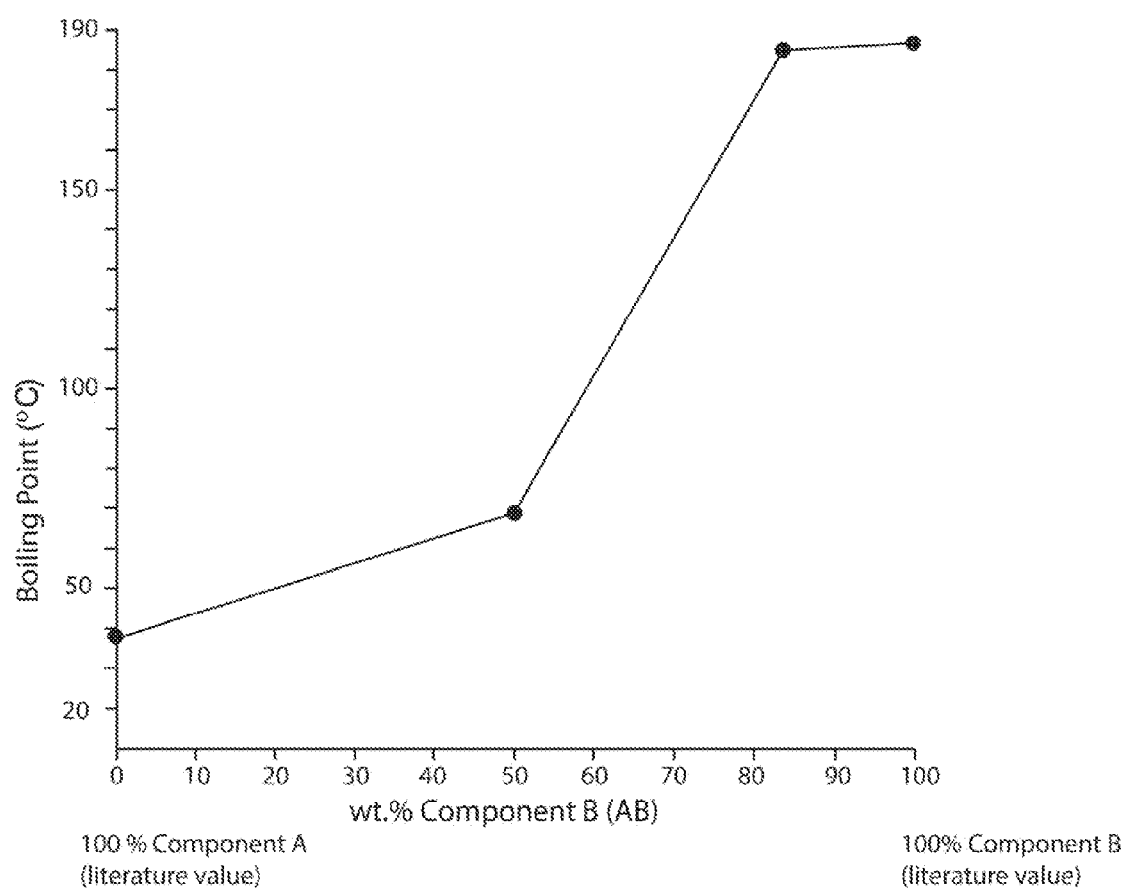
FIG. 11 is a schematic diagram of boiling point versus percent concentration of amyl butyrate and Vertrel MCA.
Figure 12:
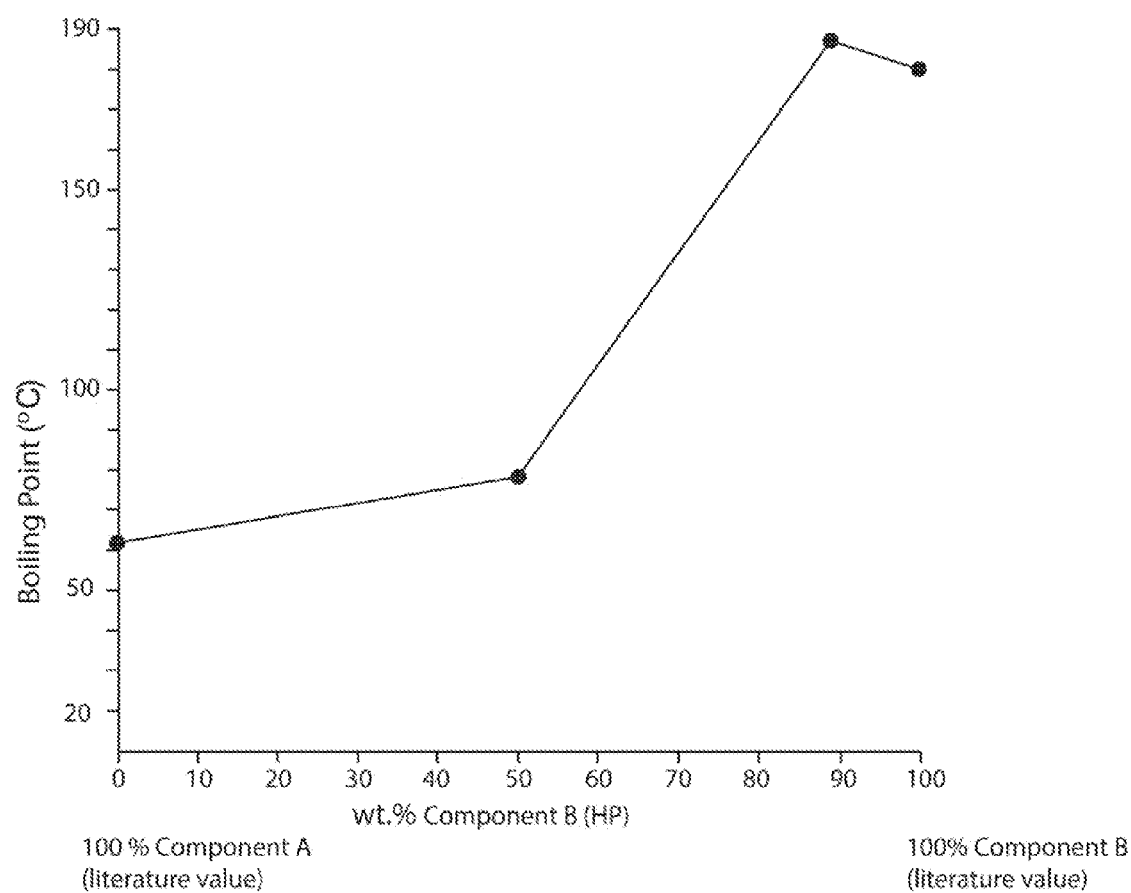
FIG. 12 is a schematic diagram of boiling point versus percent concentration of hexyl propionate and HFE 7100.
Figure 13:
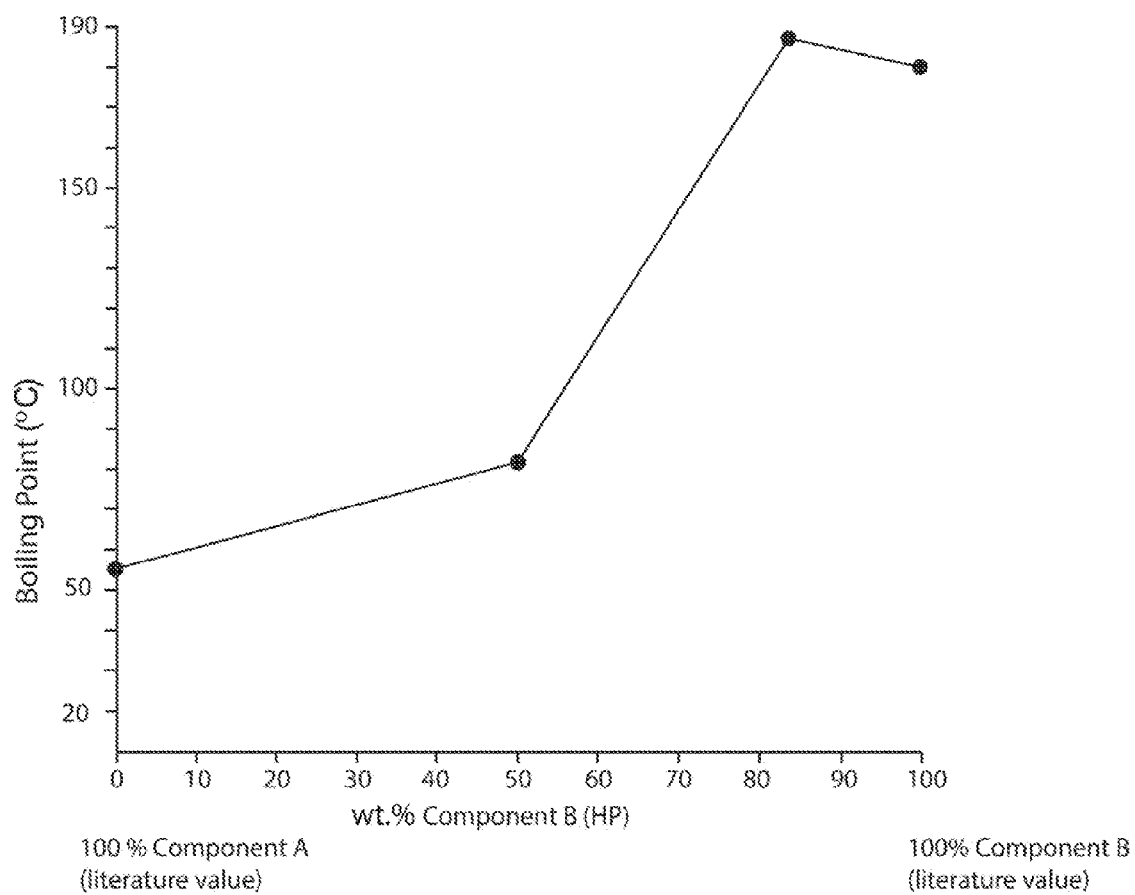
FIG. 13 is a schematic diagram of boiling point versus percent concentration of hexyl propionate and Vertrel-XF.
Figure 14:
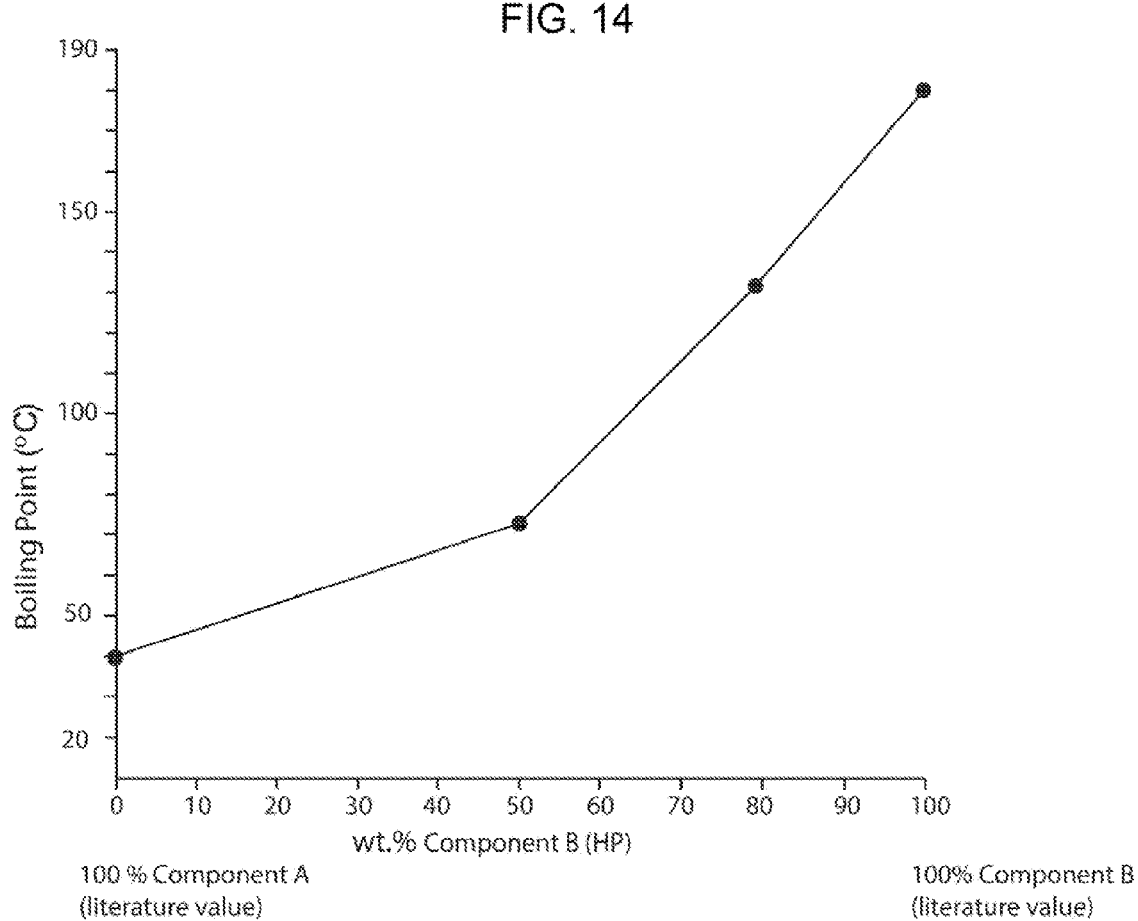
FIG. 14 is a schematic diagram of boiling point versus percent concentration of hexyl propionate and Vertrel MCA.
Figure 15:
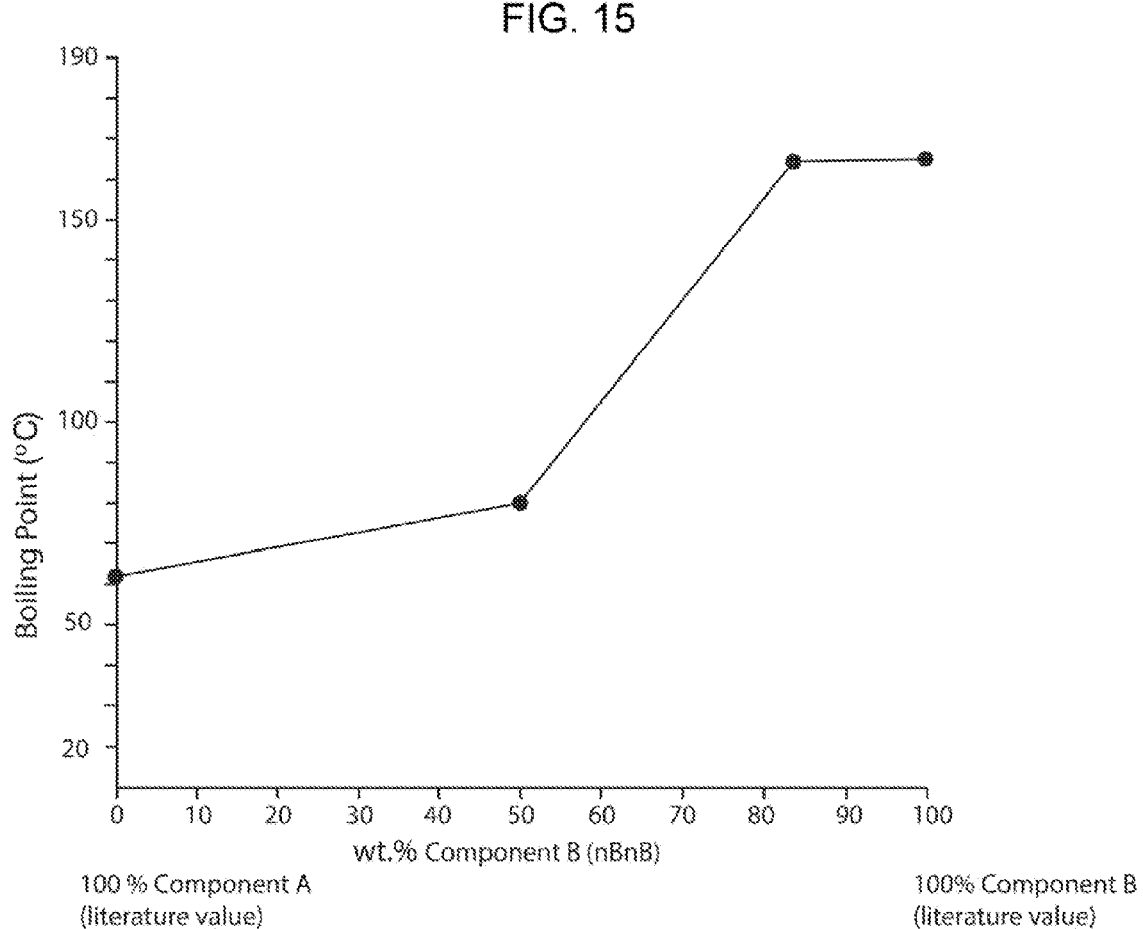
FIG. 15 is a schematic diagram of boiling point versus percent concentration of n-butyl n-butyrate and HFE 7100.
Figure 16:
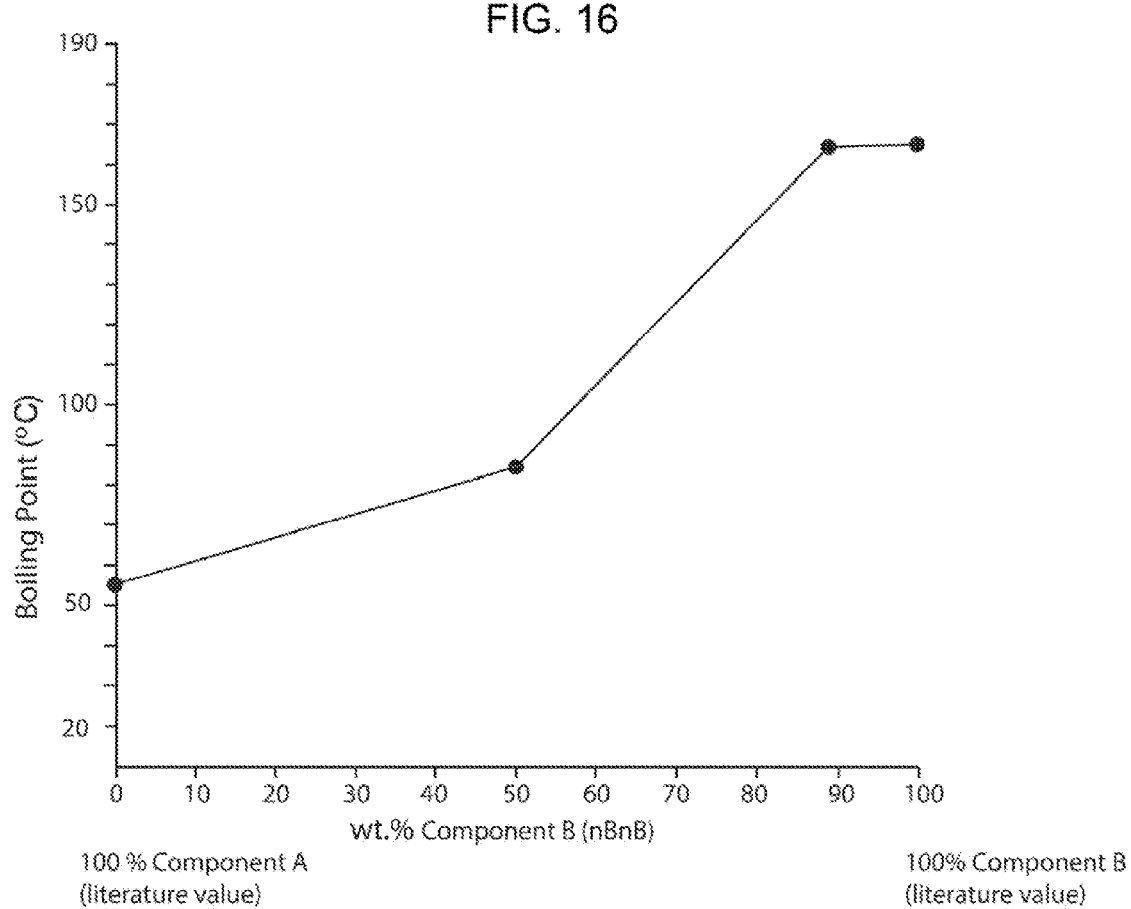
FIG. 16 is a schematic diagram of boiling point versus percent concentration of n-butyl n-butyrate and Vertrel-XF.
Figure 17:
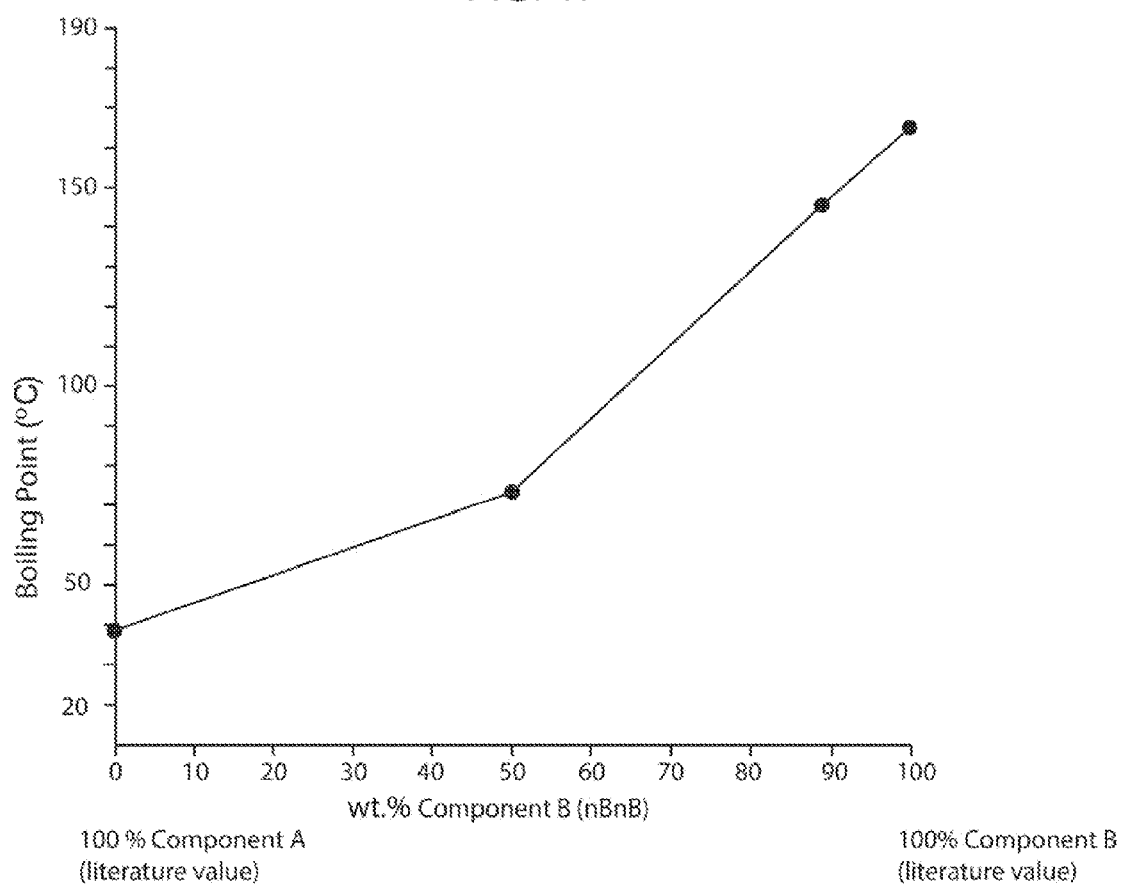
FIG. 17 is a schematic diagram of boiling point versus percent concentration of n-butyl n-butyrate and Vertrel MCA.

FIG. 8 is a comparative chart of the KB value of standard solvents and the KB values of the solvent compositions of the present invention disclosed in Tables VI-VIII above for AB, HP, and nBnB solvent blends with Novec 72DE at 40 weight percent, 65 weight percent, 80 weight percent, 90 weight percent, and 100 weight percent AB, HP, and nBnB. It is apparent from FIG. 8 that the solvent compositions of the present invention are capable of having very high solvency power that can be tailored depending on a particular use, while maintaining nonflammable or combustible properties up to a very high concentration of AB, HP, and nBnB.

Because a flash point of 18 degrees Celsius was observed at 80 weight percent IAP as shown in table IV above and a flash point of 30 degrees Celsius was observed at 88 weight percent IAB as shown in table V above, several additives were combined with the solvent compositions to raise the observed flash point to at least a preferably combustible level. Test were performed at 9 weight percent Novec 72DE, 81 weight percent IAB/IAP, and 10 weight percent additive. Table XI shown below discloses the flashpoints and boiling points of solvent compositions incorporating additives including Parachlorobenzotrifluoride (PCBTF), Alpha Terpineol (AT), Benzyl Propionate (BP), and Octyl Propionate (OP).

TABLE XI

| Solvent Composition | Boiling Point ° C. | Flash Point ° F./° C. |
|---|---|---|
| 9% Novec 72DE 81% IAP 10% PCBTF | Not measured | 96.8/36 |
| 9% Novec 72DE 81% IAP 10% AT | Not measured | 93/34 |
| 9% Novec 72DE 81% IAP 10% BP | 134 | 95/35 |
| 9% Novec 72DE 81% IAP 10% OP | 132 | 95/35 |
| 9% Novec 72DE 81% IAB 10% PCBTF | Not measured | 93/34 |
| 9% Novec 72DE 81% IAB 10% AT | 162 | 100.4/38 |
| 9% Novec 72DE 81% IAB 10% BP | 138 | 97/36 |
| 9% Novec 72DE 81% IAB 10% OP | 139 | 97/36 |

As shown above in Table XI, the addition of several of the disclosed additives were effective in raising the flash point of the solvent composition. Further, the addition of 10 weight percent AT to a solvent composition having 9 weight percent Novec 72DE and 81 weight percent IAB resulted in increasing the flash point to a combustible level.

Additional fluorinated solvents other than Novec 72DE were tested with the above disclosed propionates and butyrates. For example nonflammable solvent compositions of the present invention were created using HFE 7100,1,1,1,2,2,3,4,5,5,5-decafluoropentane, such as sold under the name Vertrel-XF, and a combination of 1,1,1,2,2,3,4,5,5,5-decafluoropentane and t-DCE sold under the name Vertrel MCA and includes approximately 61 through 63 weight percent 1,1,1,2,2,3,4,5,5,5-decafluoropentane and approximately 37 through 39 weight percent t-DCE. Compositions having 50 weight percent IAP, IAB, AB, HP, and nBnB were each combined with 50 weight percent of HFE 7100, 50 weight percent Vertrel-XF, and 50 weight percent Vertrel MCA. The boiling point and flash point of these solvent compositions were then determined and are disclosed in Table XII below. Compositions using Novec 72DE are also set forth in Table XII below as well as compositions using t-DCE combined with 50 weight percent of each AB, HP, and nBnB.

TABLE XII

| 50% Component A | 50% Component B | Boiling Point ° C. | Flash Point ° F./° C. |
|---|---|---|---|
| HFE 7100 | IAP | 82 | No Flash |
| HFE 7100 | IAB | 81 | No Flash |
| HFE 7100 | AB | 72 | No Flash |
| HFE 7100 | HP | 78 | No Flash |
| HFE 7100 | nBnB | 81 | No Flash |
| Vertrel-XF | IAP | 89 | No Flash |
| Vertrel-XF | IAB | 86 | No Flash |
| Vertrel-XF | AB | 82 | No Flash |
| Vertrel-XF | HP | 81 | No Flash |
| Vertrel-XF | nBnB | 84 | No Flash |
| Vertrel MCA | IAP | 137 | No Flash |
| Vertrel MCA | IAB | 126 | No Flash |
| Vertrel MCA | AB | 69 | No Flash |
| Vertrel MCA | HP | 71 | No Flash |
| Vertrel MCA | nBnB | 73 | No Flash |
| Novec 72DE | IAP | 78 | No Flash |
| Novec 72DE | IAB | 73 | No Flash |
| Novec 72DE | AB | 72 | No Flash |
| Novec 72DE | HP | 70 | No Flash |

TABLE XII-continued

| 50% Component A | 50% Component B | Boiling Point ° C. | Flash Point ° F./° C. |
|---|---|---|---|
| Novec 72DE | nBnB | 69 | No Flash |
| Novec 72DE | IAIB | 70 | No Flash |
| Novec 72DE | AIB | 72 | No Flash |
| t-DCE | AB | 77 | 41/5 |
| t-DCE | HP | 85 | 36/2 |
| t-DCE | nBnB | 75 | 41/5 |

100 percent HFE 7100 has a boiling point of 61 degrees Celsius, 100 percent Vertrel-XF has a boiling point of 55 degrees Celsius, 100 percent Vertrel MCA has a boiling point of 39 degrees Celsius, 100 percent Novec 72DE has a boiling point of 43 degrees Celsius, and 100 percent t-DCE has a boiling point of 48 degrees Celsius. None of these pure solvents has a flash point except t-DCE has a flash point of 36 degrees Fahrenheit (2 degrees Celsius). Because the propionates and butyrates combined with t-DCE resulted in a flammable solvent composition, it is clear that the primary contributor of nonflammability is the result of the HFE/HFC fluorinated solvent.

As discussed above, however, several of the low or non-t-DCE containing fluorinated solvents typically do not effectively dissolve SEBS polymer at the above 50/50 concentration levels. The cloud points of several styrene solvent systems using HFE 7100, Vertrel-XF, and Vertrel MCA are set forth below in Table XIII. As discussed above, the cloud point is the composition where the addition of the fluorinated solvent to the polymer system leads to saturation so that a cloudy liquid results and salting out occurs.

TABLE XIII

| Propionate/Butyrate Composition | Fluorinated Solvent (FS) | Percent FS addition to reach Cloud Point |
|---|---|---|
| 75% AB + 25% SEBS | HFE 7100 | 10-15% |
| 75% AB + 25% SEBS | Vertrel-XF | 15-20% |
| 75% AB + 25% SEBS | Vertrel MCA | 15-20% |
| 75% HP + 25% SEBS | HFE 7100 | 10-15% |
| 75% HP + 25% SEBS | Vertrel-XF | 10-15% |
| 75% HP + 25% SEBS | Vertrel MCA | 20-25% |
| 75% nBnB + 25% SEBS | HFE 7100 | 15-20% |
| 75% nBnB + 25% SEBS | Vertrel-XF | 10-15% |
| 75% nBnB + 25% SEBS | Vertrel MCA | 10-15% |

Boiling points and flash points of the solvent compositions using AB, HP, and nBnB as the propionate or butyrate and HFE 7100, Vertrel-XF, Vertrel MCA as the fluorinated solvent are shown in FIGS. 9-17 and corresponding tables XIV-XXIII below.

TABLE XIV

| % Component A (HFE 7100) | % Component B (AB) | Boiling Point ° C. | Flash Point ° F./° C. |
|---|---|---|---|
| 100% | 0% | 61 | No Flash |
| 50% | 50% | 71.9 | No Flash |
| 12% | 88% | 183 | 149/65 |
| 0% | 100% | 188 | 133/56.1 |

TABLE XV

| % Component A (Vertrel-XF) | % Component B (AB) | Boiling Point ° C. | Flash Point ° F./° C. |
|---|---|---|---|
| 100% | 0% | 55 | No Flash |
| 50% | 50% | 82 | No Flash |
| 17% | 83% | 184 | 149/65 |
| 0% | 100% | 188 | 133/56.1 |

TABLE XVII

| % Component A (Vertrel MCA) | % Component B (AB) | Boiling Point ° C. | Flash Point ° F./° C. |
|---|---|---|---|
| 100% | 0% | 39 | No Flash |
| 50% | 50% | 69 | No Flash |
| 17% | 83% | 185 | 160/71 |
| 0% | 100% | 188 | 133/56.1 |

TABLE XVIII

| % Component A (HFE 7100) | % Component B (HP) | Boiling Point ° C. | Flash Point ° F./° C. |
|---|---|---|---|
| 100% | 0% | 61 | No Flash |
| 50% | 50% | 78 | No Flash |
| 12% | 88% | 187 | 160/71 |
| 0% | 100% | 180 | 149/65 |

TABLE XIX

| % Component A (Vertrel-XF) | % Component B (HP) | Boiling Point ° C. | Flash Point ° F./° C. |
|---|---|---|---|
| 100% | 0% | 55 | No Flash |
| 50% | 50% | 81 | No Flash |
| 12% | 88% | 188 | 163/73 |
| 0% | 100% | 180 | 149/65 |

TABLE XX

| % Component A (Vertrel MCA) | % Component B (HP) | Boiling Point ° C. | Flash Point ° F./° C. |
|---|---|---|---|
| 100% | 0% | 39 | No Flash |
| 50% | 50% | 71 | No Flash |
| 21% | 79% | 130.9 | No Flash |
| 0% | 100% | 180 | 149/65 |

TABLE XXI

| % Component A (HFE 7100) | % Component B (nBnB) | Boiling Point ° C. | Flash Point ° F./° C. |
|---|---|---|---|
| 100% | 0% | 61 | No Flash |
| 50% | 50% | 81 | No Flash |
| 17% | 83% | 163 | 133/56 |
| 0% | 100% | 164 | 127/52.8 |

TABLE XXII

| % Component A (Vertrel-XF) | % Component B (nBnB) | Boiling Point ° C. | Flash Point ° F./° C. |
|---|---|---|---|
| 100% | 0% | 55 | No Flash |
| 50% | 50% | 84 | No Flash |
| 12% | 88% | 163 | 131/55 |
| 0% | 100% | 164 | 127/52.8 |

TABLE XXIII

| % Component A (Vertrel MCA) | % Component B (nBnB) | Boiling Point °C. | Flash Point °F./° C. |
|---|---|---|---|
| 100% | 0% | 39 | No Flash |
| 50% | 50% | 73 | No Flash |
| 12% | 88% | 146 | No Flash |
| 0% | 100% | 164 | 127/52.8 |

Since the low t-DCE or t-DCE free HFE/HFC solvents, such as HFE 7100, Vertrel-XF, and Vertrel MCA, combined with the propionates or butyrates and an SEBS resin typically salt-out and reach a cloud point at a relatively low weight percent (approximately 10-30 weight percent), their use in dissolving styrene polymers and creating useful systems thereof is limited. These solvent compositions without the styrene polymer, however, are nonflammable and may be useful in other applications requiring an enhanced or tailored solvency power solvent.

Tests were also performed using the AB and Novec 72DE solvent composition and multiple types of styrene polymers both with and without a tackifying resin, such as Eastotac H-100W Resin, which is a hydrogenated hydrocarbon resin. The solvent composition were mixed with 65 weight percent AB and 35 weight percent Novec 72DE and combined with 14 weight percent of three SEBS polymers including Kraton G-1652, Kraton G-1643, and Kraton FG-1901 to dissolve the SEBS polymers. All three SEBS polymers completely dissolved without shear in the AB and Novec 72DE solvent composition to create styrene polymer systems of the present invention. The solvent system having Kraton FG-1901 had high adhesion to metal thereby reducing the need for a tackifying resin. Incorporating the tackifying resin at approximately ⅓ of the SEBS polymer level led to flowable and adherent coatings for each of the above styrene solvent systems.

The solvent compositions of the present invention were also combined with methyl methacrylate copolymer. For example, 52 weight percent AB was combined with 28 weight percent Novec 72DE and 20 weight percent Paraloid B48N polymer pellets. A nonflammable miscible polymer solvent system was formed. A system including 55 weight percent AB, 30 weight percent Novec 72DE, and 15 weight percent Kraton FG-1901 SEBS resin powder was also prepared for comparative purposes. The Kraton FG-1901 was used because of its ability to adhere to metals without the use of tackifying resins. Both solvent systems were nonflammable and formed clear liquids. Further, both systems were coated onto aluminum coupons to create a thin polymer film on the coupon. The polymer films dried onto the aluminum coupons in approximately three hours at ambient/room-temperature (approximately 21 degrees Celsius). This time may be accelerated by placing the coupons in a dryer at 60 degrees Celsius for approximately one hour or by using a traditional hair dryer set on high heat and low fan speed for approximately 3 through 5 minutes. A solvent composition having approximately 65 weight percent AB and 35 weight percent Novec 72DE was then applied to the film after drying. Both films were removed from the aluminum coupon in approximately one minute.

While the polymer films were transparent, traditional pigments and colorants may be added to the systems to provide coloring for the films. In one embodiment, titanium oxide was added to create a white film, which assisted with visual clarity of complete film application to the substrate as well as removal from the substrate.

The methyl methacrylate copolymer solvent system and the comparative styrene polymer solvent system discussed above were also blended. The blend of these systems was miscible. The styrene polymer solvent system alone is more flexible than the methyl methacrylate copolymer solvent system. Further, the methyl methacrylate copolymer solvent system alone is harder and more abrasion resistant than the styrene polymer solvent system. Because the blend of these solvent systems results in a miscible system, the properties of the blended system can be tailored as needed for a particular application.

INDUSTRIAL APPLICABILITY

As discussed above, the solvent compositions and polymer solvent systems of the present invention may be used for many applications and determination of the particular components and ranges of components of the compositions and systems typically depend on the particular use of the compositions and/or systems. Frequently, additional materials and additives may be incorporated into the compositions and systems, such as the tackifying resins discussed above.

In addition to the use of tackifying resins, colorants, additives, and fillers may be added to the solvent compositions and polymer solvent systems of the present invention. For example, approximately 1-10 weight percent of a colorant or pigment, such as those sold by Sun Chemical Corporation, may be incorporated into the solvent composition or polymer solvent system. In one embodiment, approximately 4-8 weight percent of the composition or system is a colorant. In another embodiment approximately 6 weight percent of the composition or system is a colorant. Several colorants, including organic, inorganic, and blended organic-inorganic colorants, may be used with the compositions and systems of the present invention.

Further the solvent compositions and systems of the present invention may contain additives, agents, binders, suspenders, and/or viscosity modifiers such as cellulosics, including hydroxypropylcellulose or ethyl cellulose, and polyvinylpyrrolidone. Typical viscosity modifiers preferably include those that are compatible with non-aqueous fluids/liquids as well as propionates and/or butyrates, such as organo-clays. Ethyl cellulose at low percentages, such as 1-4 weight percent of the composition or system, typically improves bonding of the styrene solvent system to metals. Further, the SEBS polymer may act as a binder/suspender in reduced quantities by helping to bond down fillers (i.e., pigments or inorganic additives) to modify the color and/or performance of these materials.

As discussed above, the solvent compositions of the present invention may be utilized as cleaners including removal of polymer resins and films since the solvents may be capable of dissolving such resins and films. Further, the polymer solvent systems may be utilized as a glue and/or as a bonding agent. Because the solvent composition and systems of the present invention are typically non-aqueous, water reactive compounds may be incorporated for use as paintable coatings. Further, such solvents, systems, and coatings may be encapsulated in order to reduce reactivity with water and extend their usefulness in an air-with-moisture environment.

Functional additives for the polymers and styrene polymers such as antioxidants, light (UV) stabilizers, surfactants, plasticizers, tackifiers, dispersants, biocides, binders/suspenders, extenders, flame retardants, blocking agents, and lubricants as well as other rubber and plastic compounding ingredients and other "fillers", may be incorporated into the systems of the present invention. For example, additives such as those disclosed in U.S. Pat. Nos. 3,239,478; 4,536,454; 4,745,139; 5,315,940; and 5,777,043; as well as U.S. Patent Publication No. 2005/0119403 A1 may be useful additives to the compositions and systems of the present invention and are hereby incorporated by reference. These additives preferably do not change the properties including flammability of the solvent compositions and polymer systems of the present invention.

The solvent composition and polymer solvent system of the present invention may be combined with a nonflammable propellant, such as HFC 134A propellant or HFO-1234ze, when canned for use as an aerosol spray. The styrene solvent system of the present invention combined with a nonflammable propellant is capable of spraying on most substrates and compares to PlastiDip spray except that the spray of the present invention may be nonflammable or minimally combustible. In contrast, PlastiDip spray is very flammable.

Further, the polymer solvent system may incorporate boron nitride to enhance thermal conductivity and result in a nonflammable brushable or dippable paint or coatings. Boron nitride may also be incorporated into a polymer solvent system utilizing propellant for use as an aerosol can spray. The polymer solvent system such as the styrene solvent system may be used for sealing such as vacuum sealing or leak-sealing, or for creating an electrically insulating and flexible polymer layer, film, or coating. Such a flexible layer or film may also be used for making gaskets, for sealing mating surfaces, for water protection to prevent water from reacting with highly water reactive material, and for preventing oxidation, rusting, and/or tarnishing due to gases, vapors, and liquids. Further, the polymer solvent system utilizing polymers such as a styrene block copolymer or a methyl methacrylate copolymer may be used for sealing in fibers on the surface of porous ceramics such as lightweight fiber ceramic insulation. Advantageously, the polymer solvent system may allow for safer handling and then burn off during initial heating in the furnace environment.

The solvent compositions and polymer solvent systems of the present invention may be used as protectants such as for mirrors and highly polished surfaces. For example, a styrene polymer solvent system of the present invention may incorporate tackifiers to create a peelable coating, which protects a surface but is easily removed. Alternatively, as discussed above, the polymer solvent system may be used as a protectant on a substrate or surface without the addition of tackifiers. After application, the system will dry on a surface or substrate thereby creating a polymer film or layer that may provide chemical resistivity, corrosion protection, electrical insulation, and/or scratch/abrasion resistance. A solvent composition of the present invention can later be applied to the polymer film or layer when it is necessary to remove the film or layer. Additionally, the solvent compositions of the present invention may also be used to dissolve layers, films, and coatings other than polymer layers, films, and coatings without departing from the spirit and the scope of the invention.

While various embodiments and examples of this invention have been described above, these descriptions are given for purposes of illustration and explanation, and not limitation. Variations, changes, modifications, and departures from the compositions, systems, and methods disclosed above may be adopted without departure from the spirit and scope of this invention. In fact, after reading the above description, it will be apparent to one skilled in the relevant art(s) how to implement the invention in alternative embodiments. Thus, the present invention should not be limited by any of the above described exemplary embodiments.

Further, the purpose of the Abstract is to enable the examining office and the public generally, and especially the scientists, engineers, and practitioners in the art who are not familiar with patent or legal terms or phraseology, to determine quickly from a cursory inspection the nature and essence of the technical disclosure of the application. The Abstract is not intended to be limiting as to the scope of the invention in any way.

What is claimed is:

1. A solvent composition comprising
   between 60 to 90 weight percent of a butyrate, and
   between 10 to 40 weight percent of a fluorinated solvent blend, wherein the fluorinated solvent blend includes t-DCE.

2. The solvent composition of claim 1 wherein said butyrate is selected from the group consisting of n-butyl n-butyrate, amyl butyrate, isoamyl isobutyrate, amyl isobutyrate, and isoamyl butyrate.

3. The solvent composition of claim 1, wherein said composition is nonflammable.

4. The solvent composition of claim 1 wherein said fluorinated solvent blend comprises hydrofluoroether.

5. The solvent composition of claim 4 wherein said fluorinated solvent blend includes 68 to 72 weight percent t-DCE and 28 to 32 weight percent mixture of hydrofluoroethers.

6. The solvent composition of claim 1 wherein said fluorinated solvent blend comprises hydrofluorocarbon.

7. The solvent composition of claim 1 comprising:
   between 60 to 80 weight percent of the butyrate, and
   between 20 to 40 weight percent of the fluorinated solvent blend.

8. The solvent composition of claim 1 wherein said composition comprises 65 weight percent of the butyrate, wherein said butyrate is amyl butyrate, and 35 weight percent of the fluorinated solvent blend, wherein said fluorinated solvent blend includes between 68 to 72 weight percent t-DCE and 28 to 32 weight percent mixture of hydrofluoroethers.

9. The solvent composition of claim 8 wherein said composition is used to dissolve a polymer.

10. The solvent composition of claim 9 wherein said polymer is selected from the group consisting of an SEBS polymer and a methyl methacrylate copolymer.

11. The solvent composition of claim 1 wherein said composition comprises 80 weight percent of the butyrate, wherein said butyrate is amyl butyrate, and 20 weight percent of the fluorinated solvent blend, wherein said fluorinated solvent blend includes between 68 to 72 weight percent t-DCE and 28 to 32 weight percent mixture of hydrofluoroethers.

12. The solvent composition of claim 1 wherein said composition comprises 90 weight percent of the butyrate, wherein said butyrate is amyl butyrate, and 10 weight percent of the fluorinated solvent blend, wherein said fluorinated solvent blend includes between 68 to 72weight percent t-DCE and 28 to 32 weight percent mixture of hydrofluoroethers.

13. The solvent composition of claim 1 wherein said composition further comprises additives selected from the group consisting of a tackifier, an antioxidant, and a UV-stabilizer.

14. The solvent composition of claim 1 further comprising an additive, said additive includes alpha terpineol.

15. The solvent composition of claim 1 wherein said composition further comprises a nonflammable propellant and said composition is incorporated into an aerosol can.

16. A polymer solvent system comprising a polymer and the solvent composition according to claim 1.

17. The polymer solvent system of claim 16, wherein said system is nonflammable.

18. The polymer solvent system of claim 16 wherein said butyrate is selected from the group consisting of n-butyl n-butyrate, amyl butyrate, isoamyl isobutyrate, amyl isobutyrate, and isoamyl butyrate.

19. The polymer solvent system of claim 16 wherein said fluorinated solvent blend comprises hydrofluoroether.

20. The polymer solvent system of claim 19 wherein said fluorinated solvent blend includes 68 to 72 weight percent t-DCE and 28 to 32 weight percent mixture of hydrofluoroethers.

21. The polymer solvent system of claim 16 wherein said fluorinated solvent blend comprises hydrofluorocarbon.

22. The polymer solvent system of claim 16 comprising:
between 60 to 80 weight percent of the butyrate, and
between 20 to 40 weight percent of the fluorinated solvent blend.

23. The polymer solvent system of claim 16 wherein said system is used as a liquid rubber agent.

24. The polymer solvent system of claim 16 wherein said system is used as a paint carrier.

25. The polymer solvent system of claim 16 wherein said system is used as a cleaning agent.

26. The polymer solvent system of claim 16 wherein said system is used as a debonder.

27. The polymer solvent system of claim 16 wherein said system is used as a bonding-agent.

28. The polymer solvent system of claim 16 wherein said system is applied to a surface to form a polymer film on said surface, said polymer film is removable from said surface by applying said solvent composition to said polymer film.

29. The polymer solvent system of claim 16 wherein said butyrate is a blend of butyrates.

30. The polymer solvent system of claim 16 wherein said system further comprises additives selected from the group consisting of a tackifier, an antioxidant, and a UV-stabilizer.

31. The polymer solvent system of claim 16 further comprising an additive, said additive includes alpha terpineol.

32. The polymer solvent system of claim 16 wherein said system further comprises a nonflammable propellant and said system is incorporated into an aerosol can.

33. A solvent composition comprising:
between 26 to 90 weight percent of a butyrate, and
between 10 to 74 weight percent of a fluorinated solvent blend, wherein the fluorinated solvent blend includes t-DCE and HFE 7100 wherein said fluorinated solvent blend comprises hydrofluoroether and said hydrofluoroether is HFE 7100.

34. The solvent composition of claim 33 wherein said fluorinated solvent blend comprises 90 weight percent t-DCE and 10 weight percent HFE 7100.

35. A polymer solvent system comprising a polymer and the solvent composition according to claim 33.

36. The polymer solvent system of claim 35 wherein said fluorinated solvent blend comprises 90 weight percent t-DCE and 10 weight percent HFE 7100.

37. A solvent composition comprising:
between 26 to 90 weight percent of a butyrate, and
between 10 to 74 weight percent of a fluorinated solvent blend, wherein the fluorinated solvent blend includes t-DCE and a mixture of hydrofluoroethers of ethyl nonafluorobutyl ether, ethyl nonafluoroisobutyl ether, methyl nonafluorobutyl ether, and methyl nonafluoroisobutyl ether.

38. The solvent composition of claim 37 wherein said mixture of hydrofluoroethers includes approximately 4 through 16 weight percent of said ethyl nonafluorobutyl ether, approximately 4 through 16 weight percent of said ethyl nonafluoroisobutyl ether, approximately 2 through 8 weight percent of said methyl nonafluorobutyl ether, and approximately 2 through 8 weight percent of said methyl nonafluoroisobutyl ether.

39. A polymer solvent system comprising a polymer and the solvent composition according to claim 37.

40. The polymer solvent system of claim 39 wherein said mixture of hydrofluoroethers includes approximately 4 through 16 weight percent of said ethyl nonafluorobutyl ether, approximately 4 through 16 weight percent of said ethyl nonafluoroisobutyl ether, approximately 2 through 8 weight percent of said methyl nonafluorobutyl ether, and approximately 2 through 8 weight percent of said methyl nonafluoroisobutyl ether.

41. A solvent composition comprising:
40 weight percent of a butyrate, wherein said butyrate is amyl butyrate, and 60 weight percent of a fluorinated solvent blend, wherein said fluorinated solvent blend includes between 68 to 72 weight percent t-DCE and 28 to 32 weight percent mixture of hydrofluoroethers.

42. The solvent composition of claim 41 wherein said composition is used as a cleaning agent.

43. A solvent composition comprising:
between 26 to 90 weight percent of a blend of ethyl propionate and amyl butyrate, and
between 10 to 74 weight percent of a fluorinated solvent blend, wherein the fluorinated solvent blend includes t-DCE.

44. A polymer solvent system comprising a polymer and the solvent composition according to claim 43.

45. A polymer solvent system comprising:
a solvent composition comprising
between 26 to 90 weight percent of a butyrate, and
between 10 to 74 weight percent of a fluorinated solvent blend, wherein the fluorinated solvent blend includes t-DCE, and
a polymer,
wherein the polymer solvent system includes between 50 to 99 weight percent of the solvent composition and 1 to 50 weight percent of the polymer.

46. The polymer solvent system of claim 45 comprising between 75 to 95 weight percent of the solvent composition and 5 to 25 weight percent of the polymer.

47. The polymer solvent system of claim 46 wherein said polymer is styrene block copolymer.

48. The polymer solvent system of claim 47 wherein said styrene block copolymer is SEBS resin.

49. The polymer solvent system of claim 46 wherein said polymer is methyl methacrylate copolymer.

50. A polymer solvent system comprising:
a solvent composition comprising
between 26 to 90 weight percent of a butyrate, and
between 10 to 74 weight percent of a fluorinated solvent blend, wherein the fluorinated solvent blend includes t-DCE, and
a polymer, wherein said polymer includes styrene block copolymer.

51. A polymer solvent system comprising:
a solvent composition comprising
between 26 to 90 weight percent of a butyrate, and
between 10 to 74 weight percent of a fluorinated solvent blend, wherein the fluorinated solvent blend includes t-DCE, and
a polymer, wherein said polymer includes methyl methacrylate copolymer.

52. The polymer solvent system of claim 51 wherein said polymer further includes styrene block copolymer.

* * * * *